Figures 1, 25:
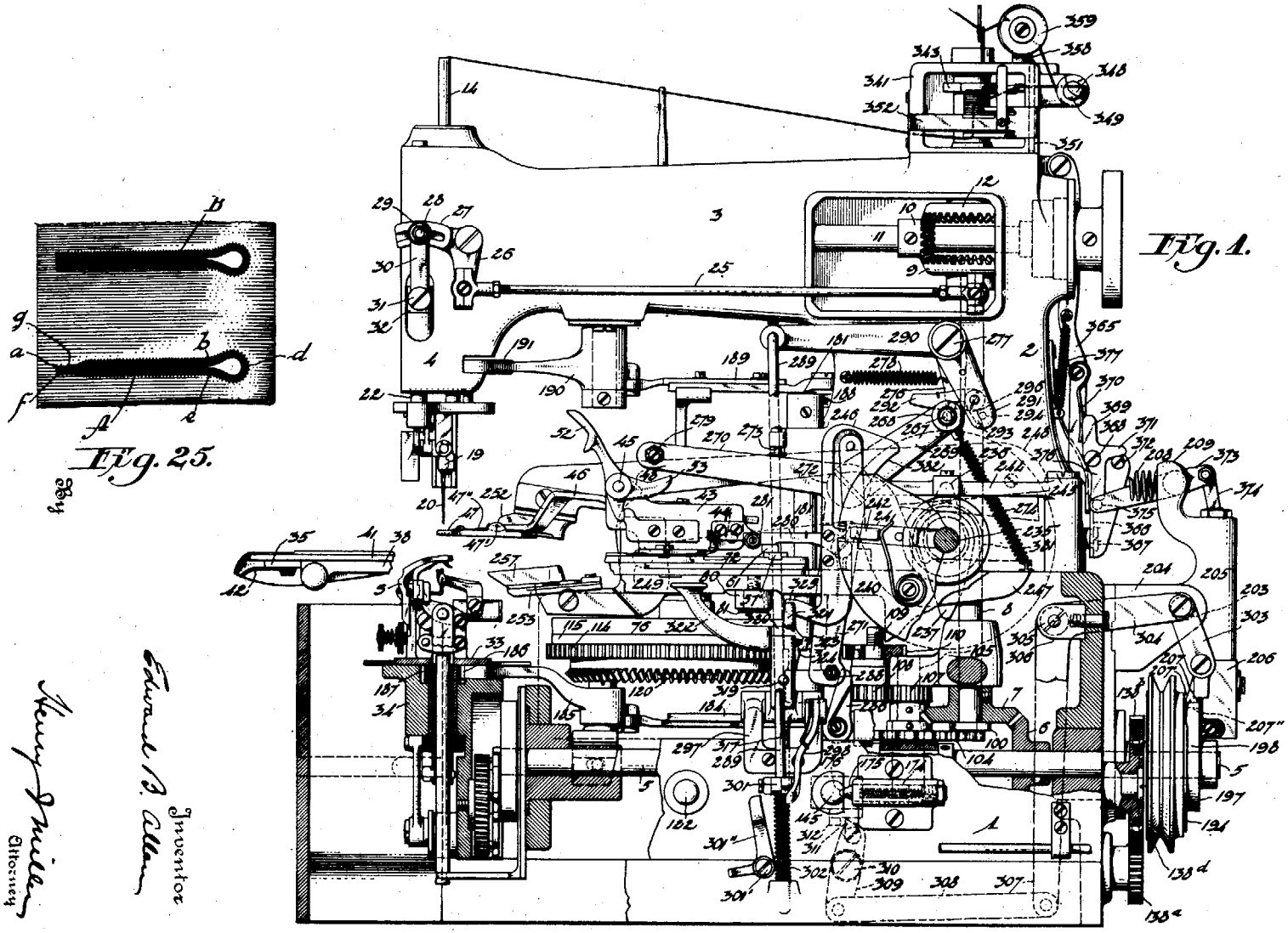

E. B. ALLEN.

BUTTONHOLE SEWING MACHINE.

APPLICATION FILED JAN. 9, 1922.

Reissued Apr. 4, 1922.

15,324.

8 SHEETS—SHEET 1.

Inventor

Edward B. Allen

By

Henry J. Miller

Attorney

E. B. ALLEN.
BUTTONHOLE SEWING MACHINE.
APPLICATION FILED JAN. 9, 1922.
Reissued Apr. 4, 1922.
15,324.
8 SHEETS—SHEET 2.
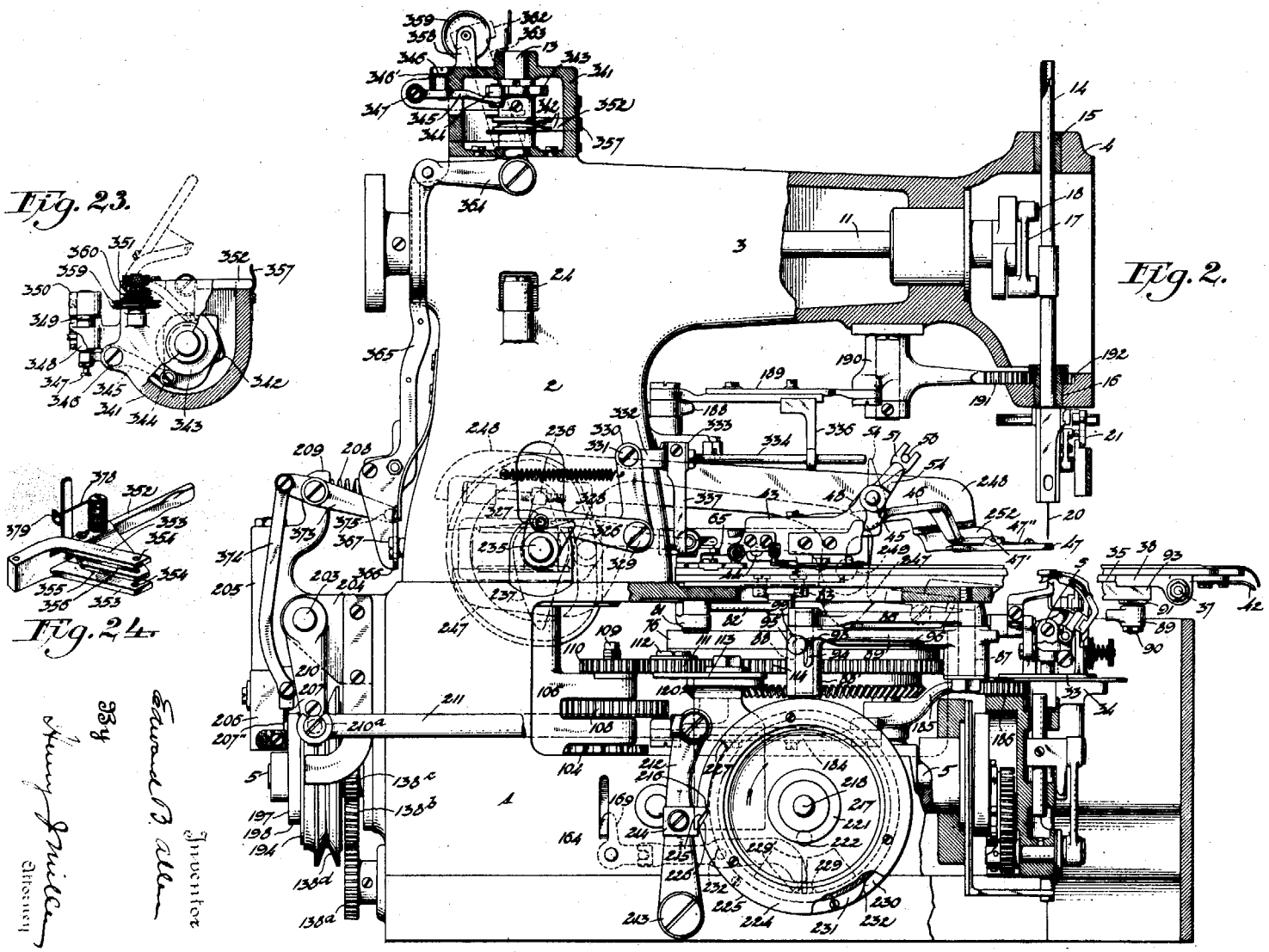
Inventor
Edward B. Allen
By
Henry J. Miller
Attorney E. B. ALLEN.
BUTTONHOLE SEWING MACHINE.
APPLICATION FILED JAN. 9, 1922.
Reissued Apr. 4, 1922. 15,324.
8 SHEETS—SHEET 3.
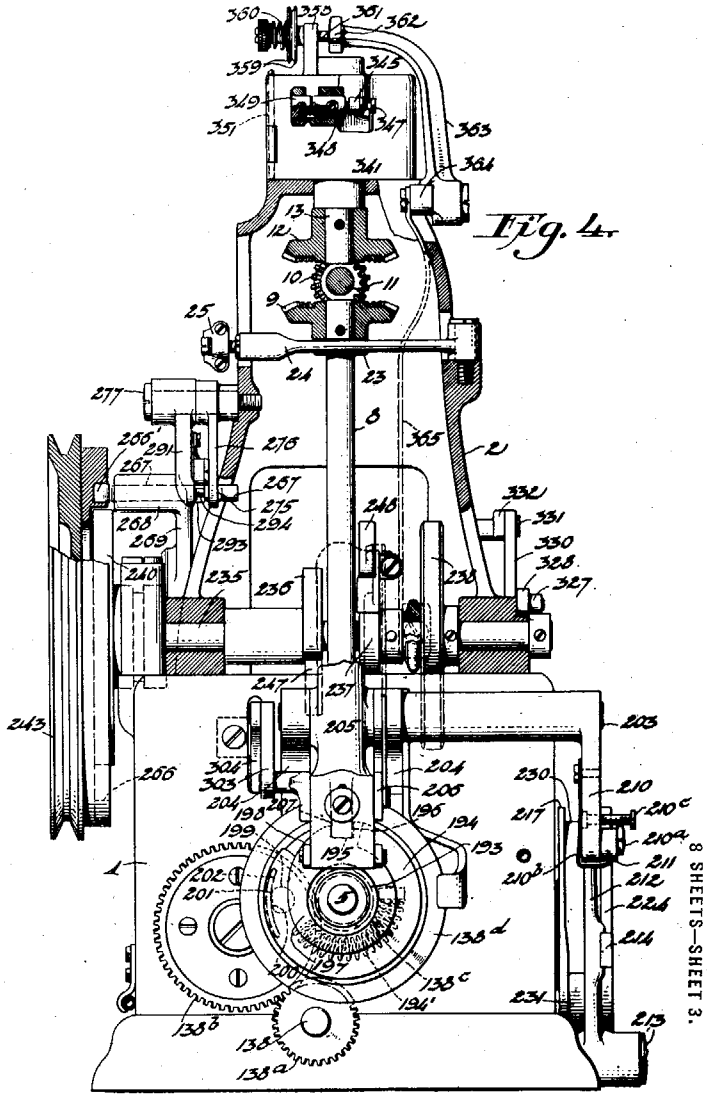
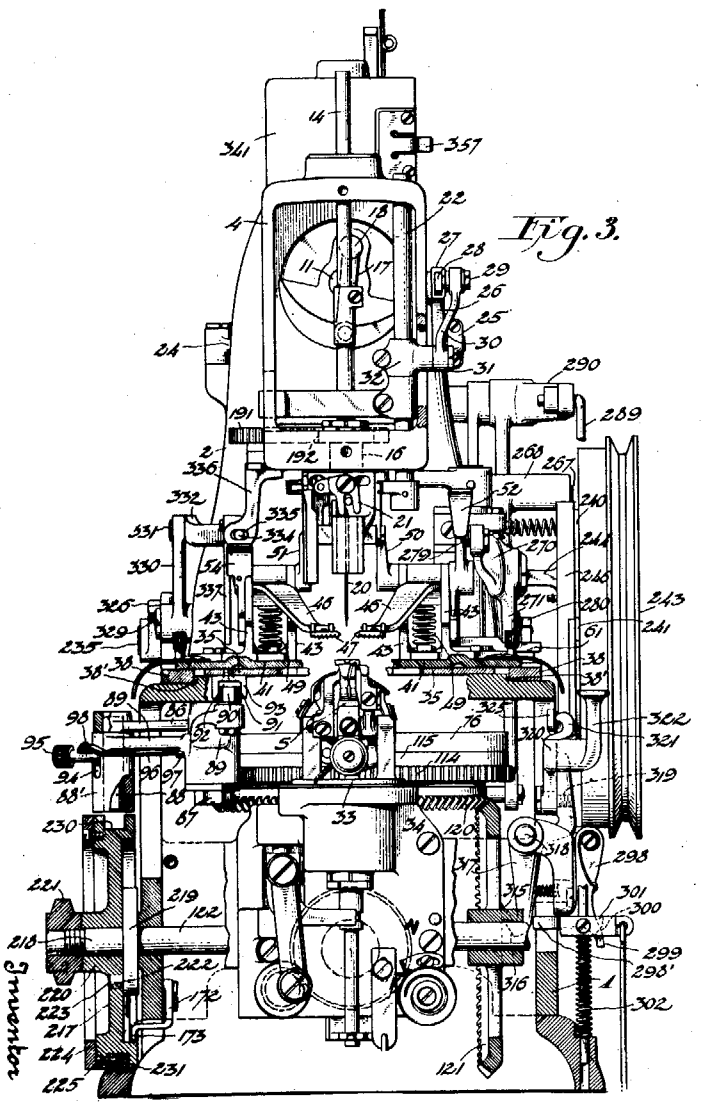
Inventor
Edward B. Allen
By
Henry Miller
Attorney

E. B. ALLEN.

BUTTONHOLE SEWING MACHINE.

APPLICATION FILED JAN. 9, 1922.

Reissued Apr. 4, 1922.

15,324.

8 SHEETS—SHEET 4.

Inventor

Edward B. Allen

By

Henry J. Miller

Attorney

E. B. ALLEN.

BUTTONHOLE SEWING MACHINE.

APPLICATION FILED JAN. 9, 1922.

Reissued Apr. 4, 1922.

15,324.

8 SHEETS—SHEET 5.

Inventor

Edward B. Allen

By

Henry J. Miller

Attorney

E. B. ALLEN.
BUTTONHOLE SEWING MACHINE.
APPLICATION FILED JAN. 9, 1922.
Reissued Apr. 4, 1922.
15,324.
8 SHEETS—SHEET 6.
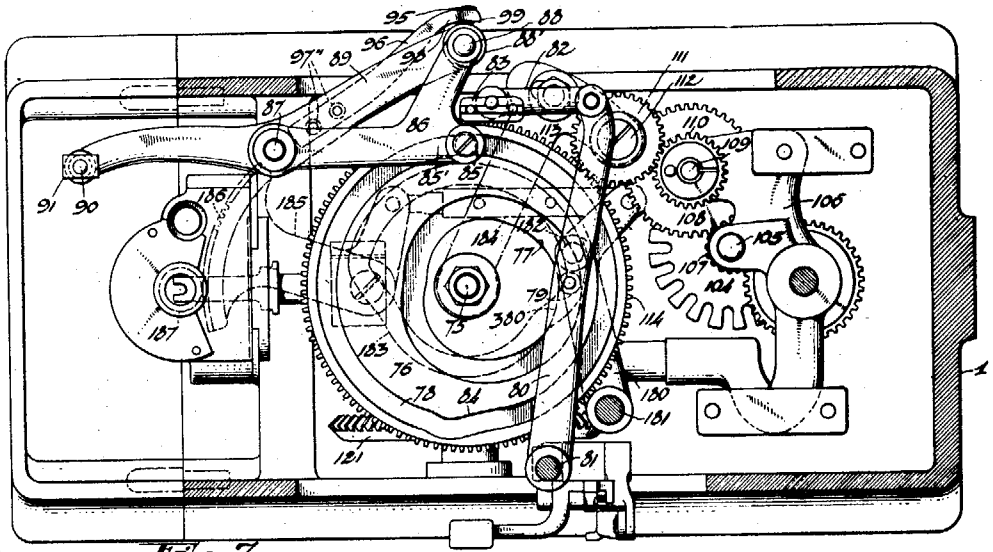
Fig. 7.
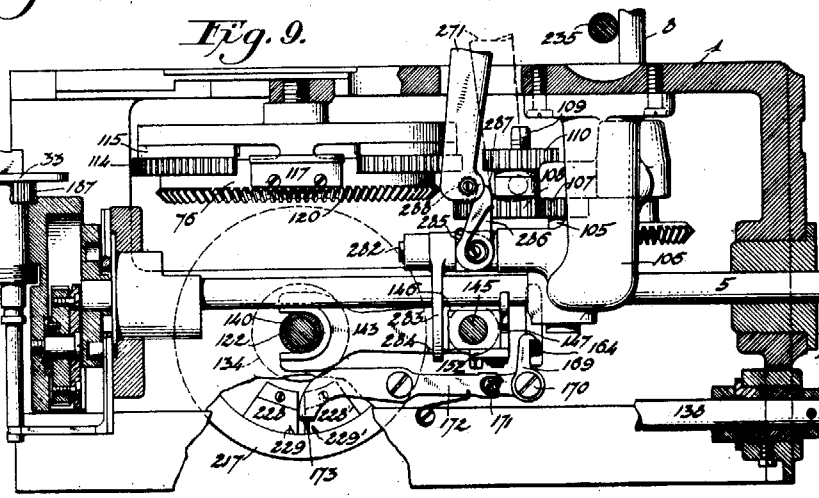
Fig. 9.
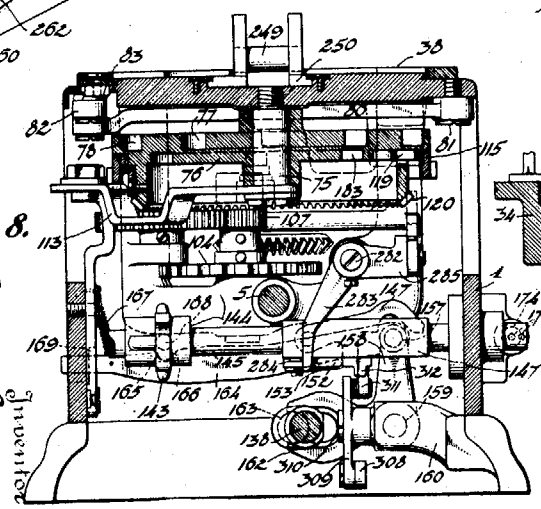
Fig. 8.
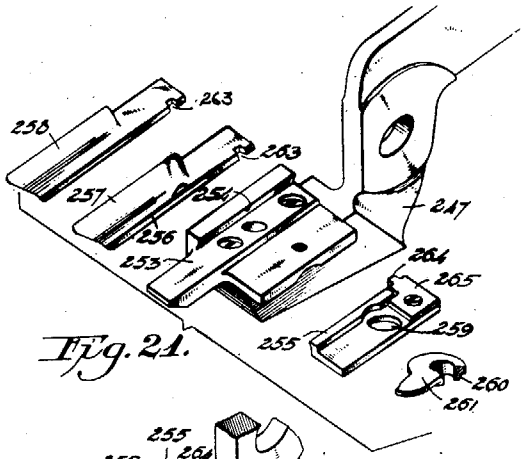
Fig. 21.
Fig. 22.
Inventor
Edward B. Allen
By
Henry J. Miller
Attorney

E. B. ALLEN.

BUTTONHOLE SEWING MACHINE.

APPLICATION FILED JAN. 9, 1922.

Reissued Apr. 4, 1922.

15,324.

8 SHEETS—SHEET 7.

Inventor

Edward B. Allen

By Henry J. Miller

Attorney

E. B. ALLEN.
BUTTONHOLE SEWING MACHINE.
APPLICATION FILED JAN. 9, 1922.
Reissued Apr. 4, 1922.
15,324.
8 SHEETS—SHEET 8.
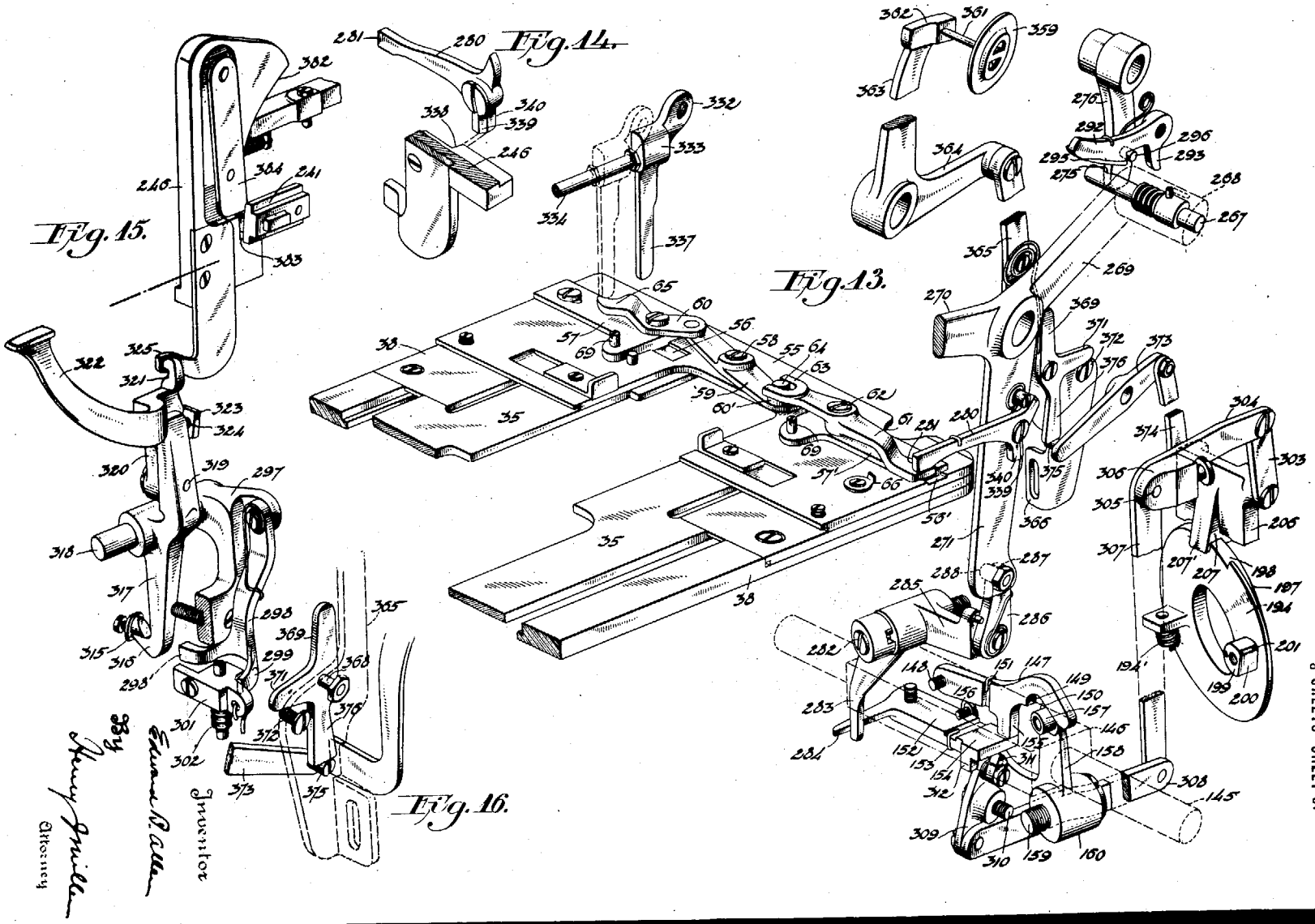

UNITED STATES PATENT OFFICE.

EDWARD B. ALLEN, OF NEWTOWN, CONNECTICUT, ASSIGNOR TO THE SINGER MANUFACTURING COMPANY, A CORPORATION OF NEW JERSEY.

BUTTONHOLE-SEWING MACHINE.

15,324. Specification of Reissued Letters Patent. Reissued Apr. 4, 1922.

Original No. 1,372,472, dated March 22, 1921, Serial No. 179,139, filed July 7, 1917. Application for reissue filed January 9, 1922. Serial No. 528,084.

*To all whom it may concern:*

Be it known that I, EDWARD B. ALLEN, a citizen of the United States, residing at Newtown, in the county of Fairfield and State of Connecticut, have invented certain new and useful Improvements in Buttonhole-Sewing Machines, of which the following is a specification, reference being had therein to the accompanying drawings.

The requirements of buttonhole sewing machines for textile fabrics have grown to such an extent that there now exists a demand for a machine which not only will produce bottonholes of different sizes or lengths but also buttonholes of other different physical characteristics such, for example, as barred or unbarred buttonholes of either the straight or eyelet-end variety.

An increase in the range of work produced by a buttonhole machine is naturally accompanied by more exacting demands upon the time and skill of the operator in charge thereof. In fact, as the art has developed and the requirements of a buttonhole machine have increased, the mechanism has been complicated to such an extent that the ordinary sewing machine operator can only with great difficulty become possessed of the mechanical skill or knowledge required to care for the machine in adapting it to do the various classes of work for which it was designed.

The main object of the present invention is to provide an automatic pattern-stitching machine, more particularly of the buttonhole type, which will be universal in character, i. e., which will produce stitched patterns having different contours or physical characteristics or, in the case of a buttonhole machine, which will produce all of the commercially required sizes and shapes of buttonholes, and which may be readily and easily adapted or set for the particular work at hand without necessitating the execution of painstaking or intricate readjustments beyond the range of skill of the ordinary sewing machine operator.

Another object of the invention is to provide a buttonhole sewing machine having overedge stitch-forming mechanism and, preferably, rotary supporting means or a turret therefor, with longitudinal and lateral feed-cams, there being one cam permanently connected to relatively feed the stitch-forming mechanism and work-holder in a given direction, and a plurality of cams and connections including a manually selective control, whereby the stitch-forming mechanism and work-holder may be relatively fed transversely to said given direction and the selected transverse feeding motion compounded with the non-variable feed motion in the said given direction, to produce any one of a plurality of buttonholes differing in size, shape, contour, or other physical characteristics.

Further objects of the invention will be hereinafter referred to or will be obvious to those skilled in the art from the following description and claims.

Buttonhole sewing machines have customarily been provided with a work-clamp and means for automatically closing the clamp upon the work and spreading the clamp to stretch the work at the beginning of a cycle of operations and with means for automatically unspreading and opening the clamp to release the work at the end of a cycle of operations. In the event of the formation of an imperfectly stitched buttonhole caused, for example, by breakage of the stitching thread, the automatic release of the work is undesirable for the reason that such release necessitates careful and accurate relocation of the work in the exact position previously occupied in order that a finished buttonhole may be produced exactly where wanted. The invention, therefore, has for a further object to equip the machine with manually controlled means operable during the stitching operation to prevent the action of the automatic work-clamp unspreading and opening mechanism with which the machine is provided.

A further object of the invention is to provide the machine with certain safeguards to insure precision in the sequence of operations of its several trains of mechanism.

The invention is particularly adapted for embodiment in a buttonhole cutting and stitching machine of the type represented in my United States Patent No. 1,179,378 of April 11, 1916. It is to be understood, however, that the invention is not limited to embodiment in machines of any particular type or construction but may be put to use in various types of pattern-stitching machines or machines adapted for predetermined stitching operations such as will readily suggest themselves to those skilled in the sewing machine art.

According to the present invention, in its preferred embodiment, the machine is constructed with two relatively movable frames, to wit: a stitch-frame and work-frame. In the present instance the stitch-frame comprises the main framework of the machine and sustains the stitch-forming mechanism including the main-shaft and a stop-motion for establishing and interrupting operative relations between said main-shaft and the source of power, while the work-frame or work-holder is mounted in the stitch-frame for longitudinal and lateral traveling movements. The machine is provided with feeding mechanism for producing relative stitch-positioning movements between the stitch-frame and work-holder. In the embodiment of the invention illustrated, the feeding mechanism comprises a main feed-wheel having a longitudinal-feed cam-element which is connected to the work-holder to impart longitudinal traveling movements suitable for the production of the longest buttonhole for which the machine is designed. The main feed wheel also preferably has a lateral-feed cam-element to produce lateral movements which may be compounded with the longitudinal movements to feed the work-holder in any desired direction. During a part of the buttonhole producing cycle the main feed-wheel is driven by stitching-feed actuating means which are connected to the main-shaft of the stitch-forming mechanism and are active only when the stitch-forming mechanism is in operation. At certain other times during the cycle the main feed-wheel is driven by a rapid-feed shaft to which it is permanently connected and which, in turn, is clutch-connected at intervals to a continuously rotating power-shaft.

Removably mounted on the rapid-feed shaft is a controlling element or wheel which may be provided with a stop-motion controlling cam-track to govern the starting and stopping of the stitch-forming mechanism and with a lateral-feed controlling cam-tack which is adapted for selective connection with the work-holder in lieu of the lateral-feed cam in the main feed-wheel to modify the path of movement of the work-holder as produced by the main feed-wheel. The auxiliary feed-wheel is also preferably provided with tripping means for automatically throwing out the rapid-feed controlling clutch upon the starting of the stitch-forming mechanism and again upon the arrival of the work-holder at initial position near the end of the buttonhole producing cycle.

The machine preferably contains buttonhole cutting mechanism comprising traveling cooperative cutting elements actuated by a cross-shaft independent of the main-shaft and adapted to be automatically coupled to and uncoupled from a continuously running element connected with the source of power. Means are preferably provided, which are periodically connected with said driving element for initially closing the work-holder upon the work and spreading the same and then setting in motion the rapid-feed actuating means in the performance of a buttonhole producing cycle.

In the present instance a throw-in device comprising a tripping point carried by the rapid feed-shaft is utilized to start the cutting mechanism and a manually controlled device, operable during the stitching operation, is provided to render said throw-in device ineffective. The machine is provided with means actuated by the cutting mechanism for unspreading and opening the work-clamp. In case of breakage of the stitching thread the operator may, therefore, prevent the release of the work and also, in the present instance, the cutting of the buttonhole. This is an important advantage for the reason that after the work has been carefully placed in the desired position in the work-holder it will be held in such position even though an imperfect buttonhole be formed, thereby saving the time which would otherwise be consumed by the operator in carefully re-locating the work in the same position.

Figure 5:
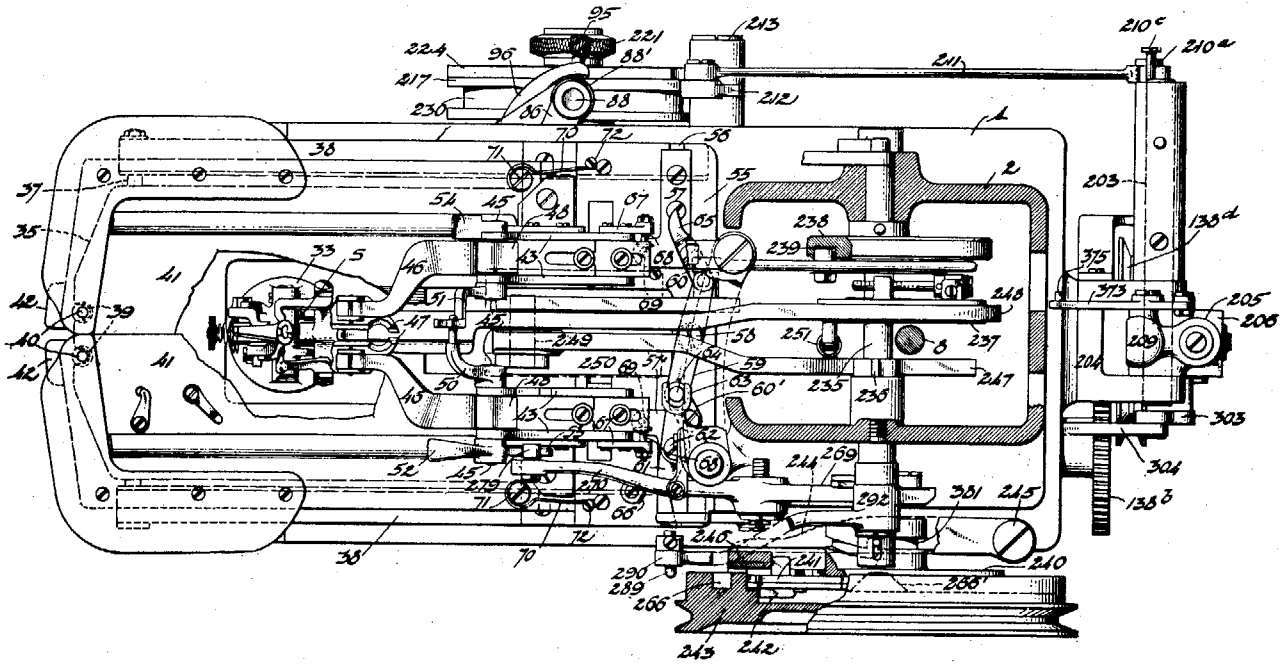
Figure 17:
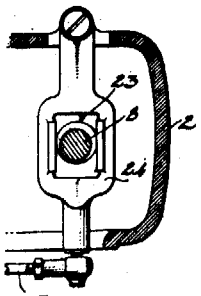
Figures 6, 18, 19, 20:
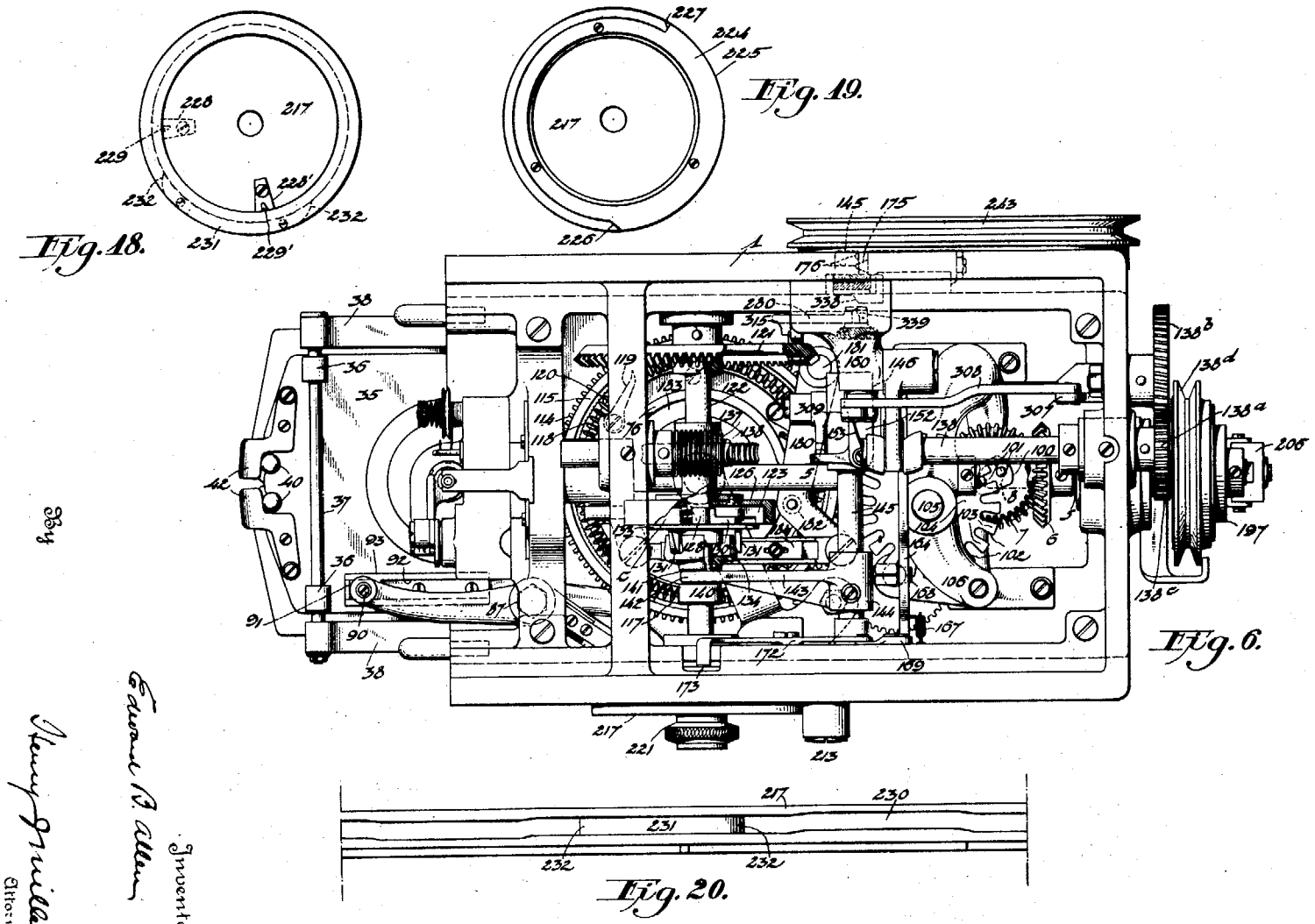
Figure 12:
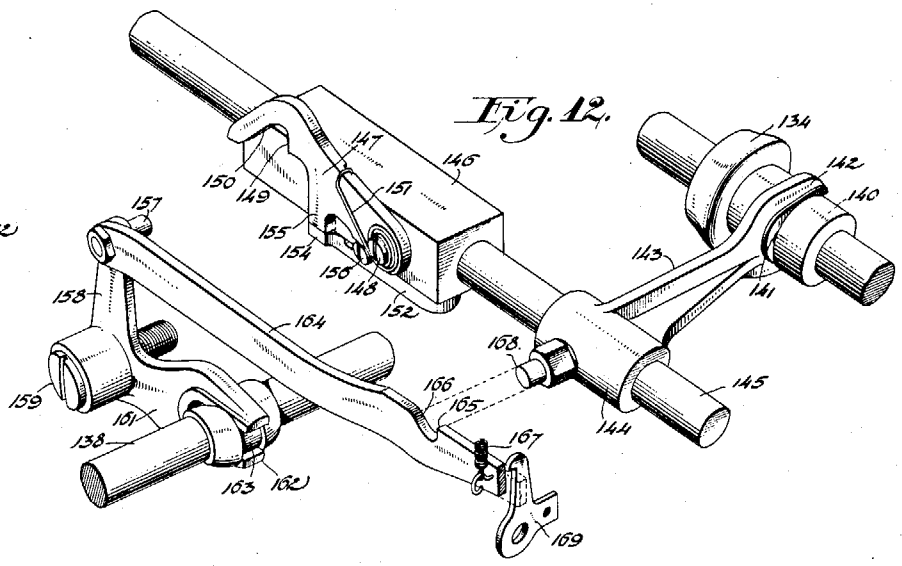
Figure 10:
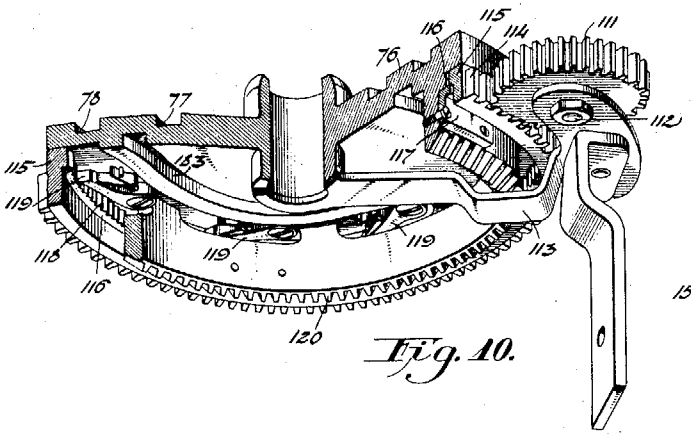
Figure 11:
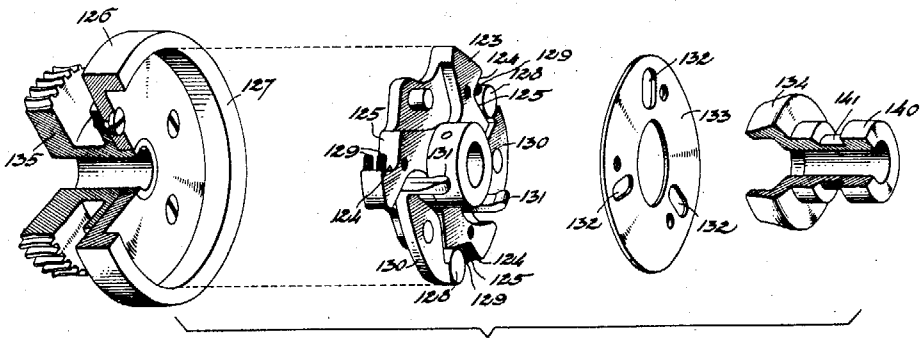

In the accompanying drawings, Figs. 1, 2, 3 and 4 are front-side, rear-side, front-end and rear-end elevations, respectively, of the machine, partly in section. Fig. 5 is a plan view of the machine with the bracket-arm shown in section and the parts above the section-plane removed. Fig. 6 is a bottom plan view. Fig 7 is a horizontal section through the bed of the machine showing a part of the feeding mechanism housed therein. Fig. 8 is a vertical transverse section through the machine-bed and main feed-wheel. Fig. 9 is a vertical longitudinal section through the machine-bed with certain parts of the mechanism therein in side elevation. Fig. 10 is a perspective view of the main feed-wheel with a portion broken away to show the feed controlling cam grooves. Fig. 11 is a disassembled perspective view of the rapid-feed controlling clutch. Fig. 12 is a disassembled perspective view of certain of the automatic actuating devices for throwing the rapid-feed controlling clutch into and out of operation. Fig. 13 is a perspective view of the tripping mechanism for starting the automatic clutch-actuating mechanism. Fig. 14 is a perspective view of the actuator for the clamp-spreading mechanism. Fig. 15 is a perspective view of the means for tripping the cutting mechanism and the latch for the starting rod. Fig. 16 is a perspective view showing a detail of the tension-release actuating mechanism. Fig. 17 is a horizontal section through the bracket-arm showing the actuating means for the needle-jogging mechanism. Figs. 18 and 19 are front and reverse views of one of a series of controlling wheels which may be readily substituted for that shown in Fig. 2 to change or modify the action of the machine. Fig. 20 is a development in plan of the feed-controlling cam-groove in the particular controlling wheel shown on the machine. Fig. 21 is a disassembled perspective view of the cutter-knife holding mechanism. Fig. 22 is a perspective view, partly in section, showing the parts assembled. Fig. 23 is a top plan view, partly in section, of the take-up, tension and thread-nipper mechanisms mounted upon the bracket-arm. Fig. 24 is a perspective of the thread-guides cooperating with the take-up and Fig. 25 is a plan view showing two of the different types of buttonholes which may be produced by the machine embodying the present invention.

In the present embodiment of the invention, as illustrated, the stitch-frame or, in the present instance, the main-frame of the machine is constructed with the hollow base 1 from which rises the bracket-arm composed of the standard 2 and tubular overhanging arm 3 terminating in the hollow head 4. Journaled within and longitudinally of the hollow base 1 is the main-shaft 5 carrying near its rearward end the bevel-gear 6 which meshes with a similar gear 7 secured to the lower end of the upright shaft 8. Fixed to the upper end of the shaft 8 is the bevel-gear 9 which meshes with a companion gear 10 of one-half its size fixed upon the upper needle-driving shaft 11 which is journaled within the tubular arm 3. Directly above and opposed to the bevel gear 9 is a similar gear 12 which also meshes with the gear 10 and is fixed to the lower end of the take-up shaft 13 journaled in alinement with the shaft 8. It will be readily understood that the gears 9, 10 and 12 are so related as to cause the shafts 8 and 13 to rotate at the same speed but in opposite directions while the needle-driving shaft 11 will be driven at double the speed of the upright shaft 8.

In general construction and arrangement of parts the needle mechanism of the present improvement is substantially the same as that disclosed in my Patent No. 1,161,277, of November 23, 1915, the tubular needle-bar 14 being journaled in the upper and lower bearings afforded, respectively, by the bushing 15 and the rotary sleeve 16 and deriving its reciprocatory motion from connections including the pitman 17 and the crank-element 18 secured upon the forward end of the needle-actuating shaft 11.

The needle-bar 14 sustains at its lower end the usual laterally jogging needle-block 19 in which is secured the shank of the eye-pointed needle 20. As the needle-bar approaches the limit of its upward movement the needle-block 19 is shifted laterally in a manner well known and fully disclosed in my said Patent No. 1,161,277 by means of the angular switch-lever 21 which is rocked by means of the well known pin-and-raceway connection with the endwise movable vertical rod 22 journaled in the head 4. In the present instance this well known needle-block jogging rod 22 is actuated by means of a cam 23, Fig. 17, mounted on the shaft 8 and embraced by a follower lever 24 whose extremity is connected by a link 25 to one arm 26, Fig. 1, of a bellcrank-lever whose other arm 27 is formed with an undercut slot to receive the headed pin 28, Fig. 3, which is secured in adjusted position in said slot by means of the nut 29. A link 30 serves to connect the pin 28 with a lateral screw-pin 31 sustained by a collar 32 clamped to the rod 22.

The loop-taking mechanism *s* which, in the present instance cooperates with the reciprocating and laterally jogging needle in the production of a chain-stitch overseam, may be of any well known construction such, for example, as that disclosed in my Patent No. 1,030,046, June 18, 1912. As usual the loop-taking mechanism *s* is sustained by the rotary turret 33 journaled in a bearing bracket 34 mounted within the base 1 and is driven through suitable actuating connections with the main-shaft 5.

The work-frame or work-holder is preferably constructed substantially in accordance with the disclosure in my Patent No. 1,136,388, of April 20, 1915. It is mounted upon the transversely travelling slide-plate 35, Fig. 6, having at its forward end the downwardly projecting apertured lugs 36 fitted to slide freely upon the cross-rod 37 which is carried by the longitudinally travelling slide-plate 38 mounted in suitable slideways 38′, Fig. 3, in the top of the bed 1. The transversely travelling or cross-slide plate 35 is formed at its forward end with the closely spaced notches 39, Fig. 5, adapted to receive the shanks of the headed pivotal studs 40 which depend from the adjacent corners of the laterally swinging clamp-plates 41. The studs 40 are detachably confined within their respective notches 39 by means of the usual angular spring-plates 42 secured to the under side of the slide-plate 35 and notched at their adjacent edges to embrace and engage the heads of the respective studs 40 below which they may be pressed to release said studs for removal of the clamp-plates 41.

Each of the clamp-plates 41 has secured upon its rearward end the usual bearing bracket comprising the spaced upwardly extending plates 43, 43, Figs. 1, 2 and 3, whose opposite ends are apertured to receive a clamp-arm fulcrum-pin 44 and a clamp-closing rock-shaft 45. Upon the fulcrum-pins 44 are mounted, in the usual manner, the rear ends of the clamp-arms 46 each carrying a pivotally mounted clamping foot 47 having a serrated lower face which is opposed, as usual, to a corresponding one of the clamp-plates 41. To the upper side of each clamping foot 47, in advance of the pivot-pin 47′, is secured a leaf-spring 47″ the rearward extremity of which extends under and bears upwardly against the forward extremity of its respective clamp-arm 46, thereby depressing the forward ends and elevating the rearward ends of the clamping feet when the latter are lifted. The clamping feet are thus caused to assume a position nearly parallel with the clamp-plates 41, when in elevated position and consequently do not interfere with the insertion or removal of thick or heavy work. The rock-shafts 45 are provided with the usual depending cams 48 which serve to depress the clamp-arms 46 in opposition to their lifting springs 49 to clamp the work. Upon the adjacent ends of the rock-shafts 45 are secured the upwardly extending arms 50 and 51 which are provided with the usual pin-and-slot connection for insuring the clamp opening and closing movements of said rock-shafts in unison. One of the rock-shafts 45, Fig. 1, is provided with a manually operated arm 52 and with an automatically operated arm 53 for closing the clamp, while the other of said rock-shafts 45 carries an arm 54, Fig. 2, which is normally actuated automatically to open the clamp at the end of a buttonhole-producing cycle, as will be hereinafter described.

The clamp-spreading mechanism comprises a toggle-device mounted at the rear of the slide-plate 35 and adapted to swing the clamp-plates 41 about their pivots 40 to stretch the work. Secured to the top of the rearward portion of the cross-slide plate 35 is a cross-plate 55, Fig. 13, which is formed with alined slideways 56, 56′ to which are fitted the clamp-spreading slide-plates 57, 57′. Fulcrumed to the cross-plate 55 at 58 is a lever 59 whose opposite ends are connected by means of links 60 and 60′, Fig. 5, to the slide-plates 57, 57′, respectively. The lever 59 and links 60 and 60′ form a toggle-device which acts to move the slide-plates 57 and 57′ simultaneously in opposite directions. The toggle-device is actuated by means of the lever 61 fulcrumed at 62 to the slide-plate 57′ and is formed with a forked extremity 63 embracing the pin 64 which connects the lever 59 and link 60′. The lever 61 is actuated automatically at the beginning of a cycle of operations to straighten the toggle and spread the clamp, while the tail 65 of the link 60 is normally actuated automatically at the end of a cycle to break the toggle and unspread the clamp, as will be described. A stop 66 secured to the cross-plate 55 serves to arrest the clamp-spreading or toggle-straightening movement of the lever 61 at a position slightly beyond alignment of the lever 59 and links 60, 60′, as will be readily understood.

Secured to the outer sides of the outermost bearing plates 43 for the clamp-arms 46 are the brackets 67 in which are adjustably fixed the screws 68 whose inwardly projecting heads are resiliently pressed against the pins 69 on the slide-plates 57, 57′ by means of the springs 70 which are secured to the clamp-plates 41 by the screws 71 and press outwardly against the grooved abutment pins 72 carried by the cross-plate 55, thereby urging the rear ends of the clamp-plates 41 inwardly. The clamp-plates 41 are thus caused to follow the spreading and unspreading movements of the slide-plates 57, 57′.

The feeding mechanism which produces relative movement between the stitch-frame and the work-frame or, in other words, between the stitch-forming mechanism and the work-holder is, in the present instance, mounted mainly within the bed 1 and is utilized to impart feeding movements to the work-holder. Journaled within the bed 1 on the vertically depending bearing pin 75, Figs. 7 and 8, is the horizontally disposed main-feed wheel 76 in whose flat upper side are cut the feed controlling cam-grooves 77 and 78. The longitudinal-feed cam-element 77 is substantially heart-shaped and is utilized to impart longitudinal traveling movements to the work-holder through suitable connections comprising the cam-follower 79 which is fixed to the lever 80 secured at one end to the bed 1 by means of the fulcrum-screw 81 and at its opposite end connected by means of a link 82 to the block 83 which is screwed to the under side of the longitudinally traveling slide-plate 38 supporting the work-holder. In the present instance, the longitudinal travelling movements imparted to the work-holder by the feed-wheel 76 have a range which is uniform for all buttonhole-producing cycles.

The lateral-feed cam-element 78, in the present instance, is cut concentric with the pin 75 throughout the major portion of its extent but is formed with a reverse curve at 84 to impart side-shift or lateral components of motion to the work-holder while the stitching is progressing around the eye of an eyelet-end buttonhole. Projecting into the side-shift cam-groove 78 is a follower 85 carried by a projection 85′ intermediate the ends of the angular lever 86 which is secured to the bed 1 by means of the fulcrum-pin 87, Figs. 2, 6 and 7, and at its opposite end is apertured to receive the endwise shiftable coupling bolt 88, Fig. 3, mounted in the apertured boss 88′ formed at the rear end of the lever 89 also fulcrumed on the pin 87. The forwardly extending end of the lever 89 carries a pin 90 on which is mounted a rectangular block 91 fitted to slide within the groove 92, Figs. 3, 6 and 7, of a block 93 screwed to the under side of the cross slide-plate 35. As the groove 92 is parallel with the slideways for the longitudinally travelling slide-plate 38 it is obvious that the longitudinal movements of the work-holder have no effect upon the lateral movements thereof.

The side-wall portion of the apertured boss 88′ is formed with a slot 94 of inverted L-shape through which projects a lateral pin or finger-piece 95 carried by the coupling bolt 88. A leaf-spring 96, secured at one end to the lever 89 at 97, bears downwardly upon the shank of the finger-piece 95 to lower the coupling bolt 88 and uncouple the levers 89 and 86 when said shank is in register with the vertical portion of the slot 94. The finger-piece 95 may be lifted manually to shift the bolt 88 to coupling position, as shown in Fig. 3, and may be turned into the horizontal portion of the slot 94 to retain the bolt in elevated position. The free end portion of the spring 96 is arched at 98, Fig. 2, to fit over the shank of the finger-piece 95 and prevent accidental displacement of the latter from the vertical portion of the slot 94. The spring 96 is further formed with an upwardly inclined tip 99 which serves to yieldingly retain the finger-piece in the position shown in Fig. 2. Thus, when the levers 86 and 89 are coupled together, the feeding movement is determined entirely by the longitudinal-feed cam element 77 and lateral-feed cam-element 78 in the main feed-wheel, which cams are formed, in the embodiment of the invention illustrated, to properly shift the work-holder in the production of an unbarred eyelet-end buttonhole.

In machines of the present type, wherein the work-holder is given a fixed longitudinal range of movement during each cycle of operations, the production of a buttonhole of given length is accomplished by providing means for starting the stitch-forming mechanism after the work-holder has passed over a given predetermined portion of its longitudinal range of movement. During the return movement of the work-holder the stitch-forming mechanism is stopped at the point of completion of the buttonhole stitching and the work-holder is thereafter moved back to initial position.

In the present embodiment of the invention, stitching-feed actuating means driven by the main-shaft of the stitch-forming mechanism are provided for imparting an intermittent or step-by-step turning movement to the feed-wheel 76 to move the work-holder during the action of the stitch-forming mechanism. The upright shaft 8, Figs. 1 and 6, carries at its lower end the driving disk 100 sustaining two diametrically opposed eccentric stud-pins 101 which are adapted to enter the peripheral slots 102 intermediate the teeth 103 of the driven disk 104 fixed to the short vertical shaft 105 journaled in the bearing bracket 106 sustained by the bed 1. The periphery of the driven disk 104 embraces the axis of rotation of the stud-pins 101 and the outer extremities of the peripheral teeth 103 are therefore slightly rounded concentrically for cooperation with the pins 101 to produce a dwell in the initial engagement of each of the driving pins therewith.

The shaft 105, Fig. 7, has secured thereto the spur-gear 107 which meshes with a companion gear 108 secured to a shaft 109 which also carries a pinion 110 meshing with an idler gear 111 journaled on a pin 112 carried at the outer end of an arm 113 whose inner apertured end embraces the bearing pin 75 for the feed-wheel 76. The idler gear 111 meshes with the peripheral gear-teeth 114 of the ring 115, Fig. 10, which is mounted upon the feed-wheel 76 concentrically with the axis of rotation of the latter and is formed with an inwardly projecting annular bearing rib 116 engaged by suitable retainers, one of which is shown at 117. The annular bearing rib 116 is provided with inwardly directed ratchet-teeth 118 which are engaged by a plurality of spring-pressed pawls 119 secured to the under side of the feed-wheel and spaced apart circumferentially a distance defined by a given whole number of teeth 118 plus a fraction of a tooth equal to the reciprocal of the number of pawls used, in accordance with the practice well known in connection with ratchet-feed mechanism. When the stitch-forming mechanism is in operation the ring 115 drives the feed-wheel through the one-way acting ratchet-and-pawl connection above described.

Rapid-feed actuating means, independent of the stitching-feed actuating means, are preferably provided for moving the work-holder up to and away from stitching position while the stitch-forming mechanism is inactive. To this end the feed-wheel is formed with a downwardly extending cylindrical portion having at its lower end the bevel-gear teeth 120 which mesh with the teeth of the bevel-gear 121 fixed to the rapid-feed shaft 122 journaled within and crosswise of the bed 1.

The feed-wheel driving action of the rapid-feed shaft 122 is controlled by means of an automatically operated clutch *c* comprising a driven disk 123 fixed to said shaft 122 and formed with peripheral notches 124, Fig. 11, having slightly eccentric bottom walls 125. The driven disk 123 is received within the recessed face of a driving disk 126 having a flange 127 which, together with the walls of the notches 124, form pockets for the reception of the clutch-rolls 128. Springs 129 within said pockets normally force the clutch-rolls in a direction to wedge them between the concentric inner surface of the flange 127 and the eccentric bottom walls of the respective notches 124 thereby establishing driving relation between the disks 126 and 123. Fulcrumed to the driven disk 123 are a plurality of levers 130 which are utilized to force the clutch-rolls 128 in a direction opposed to the action of the springs 129 to unclutch the disk 123 from the disk 126. The levers 130 are formed with lateral tail-pieces 131 which project through the radial slots 132 in the retainer plate 133 secured to the disk 123 and are adapted to be forced outwardly to positively release the clutch by means of the cone 134 which is slidingly mounted on the rapid-feed shaft 122. The driving disk 126 is screwed to the flanged hub of the worm-wheel 135 journaled to turn upon and relatively to the rapid-feed shaft and meshing with the worm 137 fixed to the continuously running shaft 138 journaled within and lengthwise of the bed 1. The rearwardly projecting end of the shaft 138 carries a gear $138^a$ meshing with an idler gear $138^b$ which, in turn, meshes with the toothed hub $138^c$ of the continuously running driving pulley or belt-wheel $138^d$ mounted to turn on the rearwardly projecting end of the main-shaft 5.

An automatic mechanism is provided for throwing the clutch *c* into and out of action to cause the rapid-feed shaft to drive or cease to drive the main-feed wheel 76. The cone 134, Fig. 11, is formed with a hub 140 having a groove 141 embraced by the forked extremity 142, Fig. 12, of a clutch actuating arm 143 formed with an apertured boss 144 fixed to the endwise shiftable rod 145 which is journaled within and crosswise of the bed 1, Fig. 6. Fixed to the rod 145 is a rectangular block 146 to one side-face of which one extremity of the coupler-arm 147 is pivoted by means of a screw 148. The opposite extremity of the arm 147 is formed with a notch defining an abrupt shoulder 149 and an inclined shoulder 150. A spring 151 urges the coupler-arm 147 downwardly but said arm is normally retained in elevated position by means of the bellcrank latch-lever 152, Fig. 13, pivoted to the under side of the block 146. A spring 153 urges the end 154 of the latch-lever 152 outwardly to a position under the downwardly extending projection 155 formed on the coupler-arm 147. A stop-screw 156 limits the outward movement of the latch-lever 152 under the influence of said spring.

When the latch-lever 152 is tripped, in a manner to be described, the notched end of the coupler-arm 147 drops into engagement with the constantly vibrating pin 157 carried by the upwardly extending arm 158 of a bellcrank-lever pivoted on the screw-pin 159 sustained by the lug 160, Fig. 8, carried by the bed 1. The horizontal arm 161 of the bellcrank-lever is formed at 162 to embrace the actuating crank 163 formed on the continuously running shaft 138. The action of the pin 157 is first to push against the abrupt shoulder 149 to shift the cone 134 away from the driven disk 123, thereby throwing in the clutch *c*. Immediately thereafter, in its return movement, the pin 157 pushes against the inclined shoulder 150 and lifts the coupler-arm 147 high enough to allow the end 154 of the retaining latch 152 to snap under said arm and retain it in inoperative position.

The mechanism for automatically throwing out the clutch *c* is as follows:—

Pivoted upon the constantly vibrating pin 157, Fig. 12, is one extremity of the reciprocating bar 164 which is provided near its opposite extremity with a notch defining abrupt and inclined shoulders 165 and 166, respectively. A coiled spring 167, Fig. 8, tends to lift the bar 164 to establish operative connections between said shoulders 165, 166 and the lateral pin 168 fixed to the boss 144 of the clutch-actuating arm 143. A bellcrank latch-lever 169 fulcrumed to the bed 1 by means of the screw 170, Fig. 9, is formed with a hooked upper extremity adapted to snap over the bar 164 and hold the latter in depressed or ineffective position. When the latch lever 169 is tripped, in a manner to be described, to release the bar 164, the abrupt shoulder 165 first acts to shift the pin 168 to the left, Fig. 12, to force the cone 134 toward the driven disk 123 to throw out the clutch *c*. Immediately thereafter, in the return movement of the bar 164, the inclined shoulder 166 rides against the pin 168 to depress the bar 164 sufficiently to permit the hooked upper end of the latch-lever 169 to snap over the bar 164 and retain it in ineffective position, as shown in Fig. 8. The horizontal arm of the latch-lever 169, Fig. 9, carries a pin 171 embraced by the upwardly spring-pressed, forked extremity of a tripping lever 172, the opposite downturned extremity of which carries a beveled point 173 adapted to be lifted at certain times during a buttonhole producing cycle to stop the rapid-feed mechanism. The endwise shiftable clutch actuating rod 145 is operatively retained in its extreme positions by means of a spring-pressed detent pin 174 formed with a pointed nose 175 adapted to enter either of the two conical depressions 176 provided in the flattened side of the outwardly projecting end-portion of said rod 145.

The stitch-forming mechanism of the present machine is given a semi-rotation in stitching the eye of a buttonhole and is thereafter turned in the opposite direction to restore the stitch-forming mechanism to initial position in accordance with the well known practice. In the present instance, the mechanism for so rotating the stitch-forming mechanism comprises the angular follower-lever 180, Fig. 7, fixed to the lower end of the upright shaft 181 and carrying the follower 182 which fits into the cam-groove 183 cut in the under face of the feed-wheel 76. The free end of the follower-lever 180 is connected by means of a lengthwise adjustable link 184 to one arm of the bell-crank-lever 185 whose other arm is formed with a segmental gear 186 meshing with a pinion 187, Fig. 1, concentric with and fixed to the rotary turret 33 sustaining the loop-taker mechanism *s*. Fixed to the upper end of the upright shaft 181, Fig. 1, is the crank-arm 188 which is connected by means of a lengthwise adjustable link 189 to one arm of the bellcrank-lever 190 whose other arm is formed with a segmental gear 191, Fig. 2, meshing with the pinion 192 concentric with and fixed to the rotary sleeve 16 of the well known needle-actuating mechanism previously referred to. The above described connections are such that the cam-groove 183 in the feed-wheel 76 serves to turn the needle and the loop-taker mechanisms simultaneously and to equal extents.

While the stitch-forming mechanism of the present machine may be provided with any desired type of stop-motion, I preferably provide stop-motion mechanism constructed substantially in accordance with the disclosure of my patent No. 863,129, of August 13, 1907, but differing therefrom in certain particulars. The present stop-motion comprises the usual coacting driving wheel $138^d$ and clutch-wheel 193 of which the latter carries the usual spring-pressed clutch-ring 194 which is formed on one side with a peripheral notch 195 affording on one side a wall or stop-shoulder 196 and having a cam-rib 197 the outer eccentric surface-portion 198 of which leads to the other side wall of the notch 195. The clutch-ring 194 is pivoted to the clutch-wheel 193 in the usual manner by means of the cylindrical projection 199 which is flattened at 200 to afford a thrust-shoulder 201 adapted to press outwardly against the usual clutch-plate 202 to force it into frictional contact with the flanged belt-wheel $138^d$.

Fixed upon the rock-shaft 203 journaled in the bearing bracket 204 of the base 1 is the stop-motion lever 205 having fitted to its lower end-portion the usual spring-pressed slide-block 206 formed with the lateral tooth 207. The tooth 207 has a front-side face 207′ adapted to bear upon the adjacent face of the clutch-ring in the initial movement of the stop-lever 205 toward stopping position, and a bottom face 207″, Fig. 1, adapted to bear upon the eccentric side-surface 198 of the cam-rib 197 when the stop-lever assumes stopping position under the influence of the spring 208 interposed between the projection 209 of said stop-lever and the standard 2.

The rock-shaft 203 has a depending crank-arm 210 which carries at its lower end a laterally extending headed screw-pin $210^a$ embraced by the vertically slotted rearward end of the link 211 whose forward end is connected to the upper extremity of the follower lever 212 fulcrumed to the bed 1 at 213 and carrying the cam-follower 214 having an inclined shoulder 215 terminating in a follower-tip 216. Secured to the inner side of the crank-arm 210 is a detainer spring $210^b$, Fig. 4, the bent lower end of which terminates beneath the rearward end of the link 211 and holds the latter in engagement with the pin $210^a$. Manual pressure upon the slide-pin $210^c$, which is carried by the crank-arm 210, will deflect the lower end of the spring $210^b$ inwardly and permit the rearward end of the link 211 to drop away from the pin $210^a$ and permit displacement of the follower-tip 216 to the left, Fig. 2, without necessarily rocking the stop-motion lever. With the parts operatively connected, when the lever 212 is shifted to the left, Fig. 2, the stop-lever 205 will be rocked to withdraw the tooth 207 from the notch 195 thereby permitting the clutch-ring 194 to rock about its pivot 199 under the influence of its spring 194′ to establish driving connection between the continuously running belt-wheel $138^d$ and the main-shaft 5 of the stitch-forming mechanism. When the lateral pressure upon the lever 212 is removed the stop-lever spring 208 will force the stop-lever 205 and parts connected therewith to stopping position, shown in Fig. 2. It will be readily understood by those familiar with this well known type of stop-motion that when the tooth 207 is withdrawn from the notch 195, the spring-pressed slide-block 206 will drop. Further, when the stop-lever is shifted to stopping position, the slide-block 206 will be lifted by the eccentric surface 198 before the tooth 207 drops into the notch 195 to arrest the motion of the main-shaft 5. These rising and falling movements of the slide-block 206 are utilized to automatically control the final stopping of the rapid-feed mechanism and the release of the tension device as will be described.

The automatic control of the stitch-forming and feeding mechanisms is effected by means of elements or tripping points preferably carried by an auxiliary or additional lateral-feed controlling cam-wheel 217 which is detachably mounted upon the outboard projections 21 of the rapid-feed shaft 122 which as will be remembered, is permanently geared with the feed-wheel 76. Referring to Fig. 3, it will be seen that the rapid-feed shaft 122 carries a collar 219 and that the feed-wheel 217 is formed with an apertured hub 220 which is removably fitted upon said projection 218 and is held against the collar 219 by means of the knurled thumb-nut 221. The collar 219 carries a steady pin 222 which enters the aperture 223 in the feed-wheel 217 to fix said wheel in predetermined angular position relatively to the rapid-feed shaft while permitting replacement of one feed-wheel by another having different characteristics. In order that the follower-tip 216 will not interfere with the removal of the wheel 217, the link 211 is first detached from the crank-arm 210 by manual pressure upon the slide-pin 210$^c$ and the follower-tip 216 is then shifted rearwardly to a position beyond the periphery of the wheel 217. The wheel 217 may have secured to its outer face the stop-motion controlling cam-ring 224, Fig. 2, having an extended concentric surface 225 which begins at the inclined starting shoulder 226 and ends with the abrupt declivity 227. The inclined starting shoulder 226 coacts with the inclined shoulder 215 of the cam-follower 214 to shift the stop-lever 205 to starting position where it is held by the concentric portion of the cam-ring 224 until the declivity 227 passes under the follower-tip 216 and permits the stop-lever 205 to spring back to stopping position.

Secured preferably to the recessed inner face of the wheel 217 are a pair of tripping plates 228, 228′, formed, respectively, with tripping points 229, 229′ which are adapted to coact with the beveled point 173 to rock the lever 172 and thereby trip the latch 169 to stop the rapid-feed, as will be understood from the foregoing description.

The feed-wheel 217, in the present instance, serves as a feed-changing element or, in other words, as an auxiliary feed-controlling or feed-actuating member. To this end the wheel 217, Fig. 3, is formed with a lateral-feed cam-groove 230 so disposed as to receive the lower end of the coupling bolt 88 which in its lower position becomes a cam-follower determining the lateral component of motion of the work-holder independently of the groove 78 in the main feed-wheel. In some cases, a filler-block 231 having inclined ends 232 may be fitted within the cam-groove 230 to automatically shift the control of the lateral motion of the work-holder from the auxiliary feed-wheel 217 to the main feed-wheel 76 by ejecting the coupling bolt 88 from the groove 230 and at the same time projecting the upper end of said bolt into the apertured free end of the lever 86. Similarly, when the filler-block 231 passes from under the bolt 88 the latter will drop back into the groove 230 whereupon the auxiliary feed-wheel will be caused automatically to reassume control of the lateral motion of the work-holder. When these automatic shifting movements of the coupling bolt are timed to occur, the apertured free end of the lever 86 and the cam-groove 230 are both in register with the opposite ends of said bolt.

The buttonhole cutting mechanism of the present machine is or may be constructed substantially in accordance with that of my United States Patent No. 1,135,933, of April 13, 1915. The cutter-shaft 235 carries the usual cams 236 and 237 for effecting the closing of the cutting elements upon the work and the cam-disk 238 formed in one face with the cam-groove 239 for effecting the travelling movements of the cutter between retracted and cutting positions. It also has fixed upon its front end the disk 240 carrying a radially spring-pressed slide-block 241 having a clutch-tooth 242 adapted for engagement with suitable clutch-teeth upon the constantly driven loose belt-wheel 243; the control of said clutch-tooth being effected by means of the usual spring-pressed lever 244 fulcrumed upon the bed 1 at 245 and formed at its free end with the cam-plate 246 cooperating with said slide-block 241 in effecting the connection and disconnection of the cutter-shaft with the belt-wheel 243 for a single rotation only, in a manner well known.

The cams 236 and 237 are adapted for engagement with the lower and upper cutter-levers 247 and 248 which are mounted upon the fulcrum-pin 249 sustained by the slide-plate 250; said levers being maintained in engagement with their respective cams by means of the spring 251, Fig. 5. The upper cutter-lever has detachably secured in its forward end one cutter-block or anvil 252 of an interchangeable series of such blocks of different lengths, and the forward end of the lower cutter-lever carries a block 253 formed with an upwardly extending fixed jaw 254 and carrying a laterally shiftable jaw 255. Dovetailed between said jaws is the plate-like shank 256 of either the eyed cutter-knife 257 or the straight bladed cutter-knife 258. The shiftable jaw 255 is in the form of a plate which is apertured at 259 to receive the eccentric hub 260 of the lever 261 mounted on the fulcrum-screw 262 threaded into the block 253. Manipulation of the lever 261 serves to shift the jaw 255 to grip or release the shank 256 of the particular cutter-knife in use. To fix the longitudinal position of the cutter-knives between the jaws 254 and 255 the shanks 256 of said knives are formed with notches 263 adapted to be entered by the projection 264 formed, in the present instance, on the plate 265 which is secured to the shiftable jaw.

The belt-wheel 243 is formed in its inner face with the cam-groove 266 having at one point of its periphery the ejecting block 266′ formed with oppositely inclined ends. This cam-groove is adapted to be entered by the spring-pressed and normally retracted plunger-pin 267 mounted within a socket in the boss 268 upon one of the arms 269 of a plural-armed rock-lever which is formed with a clamp-closing arm 270 and a depending clamp-spreading arm 271, and is fulcrumed at the junction of its arms upon the stud-screw 272 tapped into the standard 2. At the beginning of a buttonhole producing cycle, the plunger-pin 267 is released and permitted to enter the cam-groove 266 and in the continued rotation of the belt-wheel 243 the plural-armed lever receives a single complete rocking movement after which the plunger-pin is ejected by means of the block 266′. The plural-armed lever is normally held with its clamp-closing arm 270 pressed upwardly against the adjustable stop-screw 273, by means of the spring 274. The inner end of the plunger-pin 267, Figs. 1 and 13, is formed with a notch 275 to receive the end of the latch-arm 276 which is fulcrumed on the stud-screw 277 and is yieldingly held in engagement with said notch by means of the spring 278 to detain said plunger-pin in retracted or ineffective position. The lever-arm 270 carries at its forward end the roller-stud 279 which on its downward movement is adapted to depress the arm 53 to close the work-clamp.

The depending lever-arm 271 has pivoted thereto the downwardly spring-pressed clamp-spreading push-rod 280, the forward extremity 281 of which rests upon the toggle-actuating lever 61 at the beginning of a buttonhole-producing cycle. When the plural-armed rock-lever is given its counter-clockwise or clamp-closing impluse, the end 281 of the push-rod 280 is drawn rearwardly from its position above the lever 61 and drops down behind said lever so that, when the plural-armed lever is given its clockwise or clamp-spreading impulse, the end of said rod 280 will push against and actuate said lever 61 to straighten the toggle and spread the work.

The clamp-spreading movement of the plural-armed lever is utilized to trip the latch 152, previously described, to connect the rapid-feed shaft 122 with the source of power. Fulcrumed upon the fixed screw 282 tapped into the bracket 106, Fig. 9, is a bellcrank-lever having a depending arm 283 so disposed as to strike the angular extension 284 of the latch-lever 152 to trip the coupler-arm 147 into action. The other arm 285 of the bellcrank-lever has fulcrumed to its end-face a spring-pressed latch-arm 286 formed with an inclined end-face 287 with which a lateral pin 288 mounted on the lower end of the lever-arm 271 coacts, in moving from dotted- to full-line position, Fig. 9, to rock said bellcrank-lever 283, 285. During the initial or clamp-closing movement of the plural-armed lever, the pin 288 merely rocks the latch-arm 286 about its pivot without imparting motion to the arm 285, as will be readily understood.

A manually operated starting rod 289 is provided to withdraw the latch 276 and release the plunger-pin 267. The rod 289 is bent over at its upper end to enter the apertured forward extremity of the arm 290 of a bellcrank lever pivoted on the stud-screw 277 and having a depending arm 291 upon which is pivotally mounted the downwardly spring-pressed latch-arm 292 formed with a tail-piece 293 adapted to engage the pin 294 mounted on the arm 291 to limit the downward movement of the arm 292. The under side of the arm 292 is cut away to provide an abrupt shoulder 295 adapted to engage the lateral pin 296 carried by the latch 276, and in advance of said shoulder 295 is curved concentrically with the pivot-pin 277 to avoid contact with the plunger-pin 267 during the manual retraction of the latch 276. During the clamp-closing movement of the plural-armed rock-lever the plunger-pin 267, in rising, lifts the latch-arm 292 to release the latch 267 which is then free to snap into the notch 275 in the plunger-pin 267 when the latter is ejected from the cam-groove 265. After the plunger-pin 267 has once been manually released it cannot, therefore, be reengaged by the latch 276 until the plural-armed lever has executed its clamp-closing and spreading movements, the latter of which releases the latch 276 from the latch-arm 292, as above described.

Fulcrumed to a bracket 297, secured to the bed 1, is a spring-pressed latch 298 having a forwardly curved lower extremity 299, which when the starting rod is depressed, is shifted outwardly by the inclined shoulder 300, Fig. 3, of a block 301 secured to said starting-rod and snaps over said block to hold the rod 289 in running or depressed position thereby preventing a second or accidental actuation of the plural-armed lever during a buttonhole-producing cycle. A spring 302, surrounding the starting-rod and interposed between the block 301 and the bed 1 serves to urge said rod to elevated or initial position. Pivoted to the bed 1 at 301′ is a safety latch 301″ in the form of a bell-crank-lever the upstanding arm of which may be swung rearwardly by the operator to a vertical position beneath the block 301 to prevent the accidental starting of the machine by an inadvertent pressure upon the treadle during a period when the machine is not intended to be used.

The lifting of the stop-motion block 206 by the eccentric surface 198 of the cam-rib 197 is utilized to automatically connect the rapid-feed shaft with the source of power and return the work from stitching position to starting position upon the stopping of the stitch-forming mechanism. To this end, the block 206, Fig. 1, is connected by the link 303 to the lateral arm 304 of a bellcrank-lever fulcrumed at 305 to a block 306 mounted within the bed 1. The depending arm 307 of said bellcrank-lever is connected by the link 308 to the lower end of the lever 309 fulcrumed at 310 to the frame-lug 160, Figs. 8 and 13. The upper end of the lever 309 carries a pivoted and spring-pressed dog 311 which, when the block 206 is lifted, strikes the depending ear 312 of the latch 152 to trip the coupler-arm 147 into action.

In the present instance, the cutting mechanism is designed to cut the buttonhole after it has been stitched and is tripped into action by means of the beveled tripping point 315, Fig. 3, mounted on the gear 121 fixed to the rapid-feed shaft 122. The tripping point 315 strikes and deflects outwardly the inwardly extending and beveled lower end 316 of the spring-pressed lever 317 which is fulcrumed between its ends on the pin 318 carried by the bracket 297. The upwardly extending arm of the lever 317 has pivoted thereto at 319 the extension-piece 320 formed with a nose 321 and a manually operable finger-piece 322. The extension-piece 320 is further formed with an ear 323 between which and the lever 317 is interposed a spring 324 to normally maintain the nose 321 in position to strike the extension 325 of the cam-plate 246 and push the latter inwardly to release the block 241, thereby starting the cutting mechanism. During the movement of the lever 317, under the influence of the tripping point 315, it strikes the inward extension 298′ of the starting-rod latch 298 and shifts the latter outwardly to release the starting-rod which then springs upwardly to initial position.

The single rotation of the cutter-shaft 235 is utilized in the present instance to unspread and open the work-clamp. Mounted on the cutter-shaft is a cam 326, Fig. 2, which during the latter portion of the revolution of said shaft 235 lifts the follower 327 carried by the rearwardly extending arm 328 of a bellcrank-lever fulcrumed to the standard 2 at 329. The upwardly extending arm 330 of said bellcrank-lever is pivotally connected at 331 to the ear 332 of a block 333 fixed to the rear end of a push-rod 334 whose forward end is loosely fitted within an aperture 335 formed in the arm 336 depending from the link 189. When the follower 327 is lifted, the push-rod 334 strikes the then substantially vertically disposed arm 54 carried by one of the clamp-closing rock-shafts 45, to release the work-clamp. At the same time the lower end of the tappet-arm 337 depending from the block 333 strikes the tail-piece 65 of the link 60 to break the clamp-spreading toggle-mechanism.

If, for any reason, the operator wishes to prevent the normally automatic action of the cutting mechanism or the normally automatic unspreading or releasing action of the clamp-actuating toggle-mechanism, manual pressure upon the finger-piece 322 will swing the nose 321 forwardly so that said nose will not strike the extension 325 during its inward travel under the influence of the tripping point 315.

In order that the push-rod 280 may not be directly behind the lever 61 and impede the unspreading action of the toggle-mechanism caused by the depending tappet-arm 337 during the action of the cutting mechanism, the cam-plate 246 is provided with an inclined shoulder 338 which, when said cam-plate is pressed inwardly to start the cutting mechanism, coacts with the similarly inclined shoulder 339 formed on the tail-piece 340 of the push-rod 280 to elevate the free end 281 thereof above the path of rearward movement of the lever 61.

The needle-thread controlling devices provided for the present machine are as follows:—The vertical take-up shaft 13 is journaled within the housing 341 screwed to the top of the bracket-arm 3 and has fixed thereto the spaced parallel take-up cam-plates 342 and the thread-nipper actuating cam 343 which is engaged by the follower 344 at the forward extremity of the lever 345 pivoted at 346 to a lug 346′ on the housing 341 and, at its rearward end, carrying an adjustable push-screw 347 the extremity of which bears against the outwardly spring-pressed nipper-pin 348 to force the latter into nipping relation with the stationary abutment-piece 349 socketed within the apertured ear 350 formed on the housing 341.

Pivoted upon the vertical pin 351, Fig. 1, is a manually shiftable bar 352 formed with inwardly extending spaced arms 353, Fig. 24, the extremities of which are provided with thread-guiding apertures 354 which, when the lever 352 is in operative position, lie one above and one below the take-up plates 342. Secured to the lever 352 is a stripper-plate 355 formed with a thread-slot 356 whose innermost extremity registers with the thread-guiding apertures 354. The stripper-plate is disposed at a level intermediate the take-up cam-plates 342. The spring 357, which coacts with the end of the lever 352 to yieldingly retain the latter in operative position, permits said lever to be readily shifted to dotted line or threading position, Fig. 23. The take-up cam-plates are shaped to closely control the needle-thread while meeting the thread requirements of the loop-taker mechanisms.

Mounted upon a vertical lug 358 formed externally of the housing 341 is a tension device of well known form, comprising the separable tension-disks 359 normally pressed together by means of the spring 360 which is rendered ineffective by means of the axial pin 361. Disposed at the end of the pin 361 is the cam-faced head 362 at the extremity of an arm 363 of a bellcrank-lever whose rearwardly projecting arm 364 is pivoted to a vertical bar 365 whose lower end is formed with a slotted ear 366 entered by a guide-screw 367 threaded into the standard 2. Pivoted to the side of the bar 365 at 368 is a plural-armed latch whose upper arm 369 is pressed to the right, Fig. 1, by means of the spring 370 to normally force the lateral arm 371 of said latch in contact with the stop-screw 372. Pivoted to the stop-motion lever 205 is a lever 373 whose rear end is connected by the link 374 to the vertically movable stop-block 206 and whose front end carries a lateral pin 375 adapted to engage under and lift the squared lower end of the lower arm 376 of said plural-armed latch to shift the cam-shaped head 362 into position to release the tension, as shown in Fig. 13.

With the parts in the position shown in Fig. 1, when the upper end of the stop-motion lever 205 is rocked to the left to start the stitch-forming mechanism, the pin 375 moves from under the arm 376 thus permitting the bar 365 to drop under the influence of the spring 377 and restore the tension-device to operative condition. When the stop-motion lever 205 is shifted to stop the stitch-forming mechanism the pin 375 first strikes the side of the arm 376 and rocks it toward the right, Fig. 1. When the block 206 is lifted by the eccentric surface 198 the pin 375 is lowered to permit the squared lower end of the arm 376 to snap back to a position over the pin 375. Subsequently, when the tooth 207′ of the block 207 drops into the notch in the ring 194, the pin 375 will be elevated to relieve the tension, as will be readily understood.

A slack-thread controlling or check-spring 378 having a thread-eye 379 is mounted on the bar 352 in position to engage the length of needle-thread extending between the thread-nipper and the upper of the thread-guiding apertures 354. The office of this spring is primarily to control the thread during the first part of the down-stroke of the needle to keep it from catching on the needle-point.

In the operation of the machine to produce, for example, a taper-barred eyelet-end buttonhole, such as shown at A, Fig. 25, the operator first insures that an eyed cutter-knife 257 is carried by the lower cutter-lever 247, and that a cutter-block or anvil 252 of the required length is inserted in the upper cutter-lever 248. An appropriate interchangeable wheel 217 of the series furnished with the machine having the shoulders 226, 227 and tripping points 229, 229′ properly spaced or timed to produce a stitched buttonhole of the required length, and having a lateral-feed controlling cam-groove 230 of the proper contour for taper-barring, is then placed upon the rapid-feed shaft. The coupling bolt 88 is set, preparatory to a buttonhole-producing cycle, in its forward position in the vertical position of the slot 94, whereupon it drops into engagement with the cam-groove 230 in the auxiliary feed-wheel 217.

The work is then inserted beneath the clamping feet 47 and the starting rod 289 is drawn downwardly to starting position wherein it is held throughout the ensuing cycle of operations by the latch-arm 298. In this movement the bellcrank-lever 290—291 is rocked to cause the shoulder 295 of the latch-arm 292 to shift the lateral pin 296 to the right, Fig. 1, thereby withdrawing the latch 276 in opposition to its spring 278 to release the plunger-pin 267. In case the plunger-pin should enter the cam-groove 266 in front of the ejecting block 266′ it will merely be forced outwardly and permitted to return into the cam-groove while the latch 276 remains in retracted position.

In the rocking of the plural-armed lever by engagement of the plunger-pin with its actuating cam-groove, the plunger-pin is carried laterally with the lever-arm 269 and lifts the latch-arm 292 thereby releasing the latch 276 which returns to operative engagement with the side of the plunger-pin under the action of its spring 278; the latch snapping into the notch 275 in said plunger-pin when the latter is next ejected from the cam-groove 266. Upon the tripping of the starting rod latch 298 at the completion of the cycle, the bellcrank-lever 290, 291 springs back to initial position while the shoulder 295 of the tripping arm 292 snaps forwardly over the pin 296 without affecting the latch 276.

The initial of counter-clockwise movement of the plural-armed lever acts to close the clamp; to draw back the push-bar 280 so it can snap down behind the clamp-spreading toggle-actuating lever 61; to move the pin 288 to the other side of the arm 286; and to lift the arm 292 to release the latch 276. During the reverse or clockwise movement of the plural-armed lever, the push-bar 280 spreads the clamp while the pin 288 strikes and depresses the inclined end 287 of the arm 286, thereby tripping the latch 152 to throw in the clutch *c* and connect the rapid-feed shaft 122 to the continuously rotating driving shaft 138.

Under the influence of the shaft 138, which is now driving the rapid-feed shaft and, through it, the main and auxiliary feed-wheel 76 and 217, respectively, the work-holder is rapidly shifted longitudinally from initial position toward the point where the stitching is to be started. As the rapid-feed progresses the inclined starting shoulder 226 approaches the similarly inclined shoulder 215 of the follower 214 and, at stitching position, shifts said follower 214 to rock the stop-motion lever 205 and start the stitch-forming mechanism. At substantially the same time the tripping point 229 carried by the controlling wheel 217 lifts the beveled point 173 to trip the latch 169 and effect the automatic throwing out of the clutch to disconnect the rapid-feed shaft from the continuously rotating shaft 138.

Upon the starting of the stitch-forming mechanism the stitching-feed actuating mechanism, including the eccentric pins 101 and the toothed wheel 104, comes into action to drive the main-feed wheel and through it, the rapid-feed shaft 122 and auxiliary feed-wheel 217, imparting an intermittent or step-by-step movement to the work-holder as the stitches are formed by the coacting needle and loop-taker mechanisms. The starting shoulder 226 and tripping point 229 are timed to act substantially simultaneously so that the stitching feed will begin moving the work-holder at substantially the same time the rapid-feed is thrown out.

When the stop-motion lever is shifted to running position, the tooth 207 of block 206 is withdrawn from the clutch-ring 194 which is shifted by the spring 194′ to effect the clutching action of the thrust-shoulder 201. At the same time the lever 373 is shifted forwardly to slide the pin 375 from under the arm 376 to allow the tension releasing link 365 to drop under the influence of the spring 377 and restore the tension-device to effective condition.

As the stitching progresses from the point *a* to the point *b*, Fig. 25, the side-shift movements of the work-holder are determined entirely by the feed-controlling groove 230 in the auxiliary feed-wheel 217 and, in the present instance, the groove 230 is so shaped as to cause the initially formed stitches *g* to lie across the center line of the buttonhole. When the stitching reaches the point *b* the filler-block 231 ejects the coupling bolt 88 from the auxiliary feed-controlling groove 230 and effects the coupling of the levers 86 and 89 thereby shifting the control of the side-shift movements of the work-holder from the auxiliary to the main feed-wheel, while the stitching progresses around the eye *d*. While it is obvious that the auxiliary feed groove 230 may be so shaped as to control the side-shift movements of the work-holder throughout the entire stitching cycle to produce a stitched pattern of any desired contour, I prefer to shife the control of said side-shift movements to the main-feed wheel prior to stitching around the eye of an eyelet-end buttonhole for the reason that these stitches should be located in the work with great precision and it is deemed preferable to provide a built-in feed-wheel to control the feed at this point for all eyelet-end buttonholes, whether barred or unbarred.

When the stitching reaches the point *e*, opposite the point *b*, filler-block 231 moves from under the coupling bolt 88 which thereupon drops back into the auxiliary feed-groove 230, whereupon the auxiliary feed-wheel 217 assumes control of the side-shift movements of the work-holder as the stitching progresses along the unfinished side of the buttonhole. Just before the point *f*, opposite the point *a*, is reached the work-holder is shifted laterally to cause additional barring stitches *g* to be superimposed upon the initial barring stitches.

Of course, the inclined ends of the filler-block 231 need not necessarily be timed to act upon the coupling bolt 88 at the precise points *b* and *e*, indicated in Fig. 25, but may obviously be timed to act at any point along either of the straight sides of the buttonhole between the end bar and the eye.

When the point *f* is reached the declivity 227 passes under the follower-tip 216 whereupon the stop-motion lever 205 springs back to the position shown in Fig. 1; the block 206 being raised by the eccentric surface 198 before the tooth 207 drops into the stop-notch in the cam-ring 194. This lifting of the block 206 depresses the pin 375 whereupon the lower end of the arm 376 snaps over said pin. When the tooth 207 drops into said stop-notch the arm 376 is lifted to release the tension on the needle-thread. Also, when the block 206 is lifted, it acts through the links 303, 308 and bellcrank-lever 304, 307 to rock the lever 309 and trip the latch 152 thereby causing the clutch *c* to be automatically thrown in to re-connect the rapid-feed shaft to the continuously rotating shaft 138 and shift the work-holder rapidly back toward initial or cutting position.

When cutting position is reached the dead-point 380 in the heart-shaped cam-groove 77 holds the clamp stationary while the tripping point 315 carried by the gear-wheel 121 acts upon the lever 317 and cam-plate extension 325 to release the slide-block 241 and thereby couple the cutter-shaft to the continuously running belt-wheel 243. Immediately thereafter, the tripping point 229′ acts to trip the constantly reciprocating bar 164 into action to throw out the clutch *c* and stop the rapid-feed shaft. When the cam-plate 246 carried by the lever 244 is shifted inwardly to start the cutter-shaft, the cam-groove 381, Figs. 1 and 5, assumes control of said lever and holds it away from the belt-wheel 243 until the cutter-mechanism has effected its function, whereupon the cam 381 moves the plate 246 towards the belt-wheel 243 in time for the eccentric surface 382 to be struck by the slide-block 241 which latter is thereby retracted to uncouple the cutter-shaft from the belt-wheel 243 at the end of a single rotation. The movement of the cutter-shaft is arrested when the block 241 strikes the stop-shoulder 383 on the cam-plate 246. The lower end of a spring-controlled latch-arm 384 pivoted to said cam-plate 246 snaps over the block 241 and prevents rebound of the cutter-shaft from stopping position. Just before the cutter-shaft is uncoupled from the belt-wheel 243 the cam 326 actuates the push-rod 334 and arm 337 to unspread and open the work-clamp.

Should the operator desire to produce an unbarred eyelet-end buttonhole, such as shown at B, Fig. 25, it is merely necessary to elevate the finger-piece 95 manually and shift it into the horizontal portion of the slot 94, thereby rendering the auxiliary lateral-feed cam 230 ineffective and selecting the lateral-feed cam 78 for the control of the side-shift movements of the work-holder. A cutter-block or anvil 252 having a length appropriate to the unbarred buttonhole to be stitched is, of course, inserted in the upper cutter-lever.

To stitch a straight buttonhole, a straight knife 258 is substituted for the eyed-knife 257 and an appropriate lateral-feed wheel 217 having a straight cam-groove 230 which is devoid of a filler-block is placed upon the rapid-feed shaft. The selectively controlled finger-piece 95 is set in its forward position in the vertical portion of the slot 94.

Should the machine be set for producing unbarred buttonholes of given length and it is desired to change over to the production of barred buttonholes having slits of the same length as the unbarred buttonholes, the same anvil block is left in the machine but the feed-wheel 217 is replaced by a similar wheel for producing barred buttonholes of a length appropriate to be cut upon the same cutter block.

It is to be understood that the above suggested uses of the machine do not exhaust its possibilities but are merely illustrative of its range of usefulness. The feed-controlling cam-grooves in either the main or auxiliary feed-wheels may be given any desired contour, to secure any desired resultant relative movement between the stitch-forming mechanism and work-holder; the mechanism being such that the operator may, by a selective shift of the coupling bolt 88, connect the work-holder to either of the lateral-feed controlling cam-elements 78, 230, and thus, by a simple resetting of the machine and without removing or replacing interchangeable or substitute parts, change over from the production of a given buttonhole to the production of another buttonhole differing in a desired characteristic, other than in length, from the buttonhole first produced. Furthermore, by means of the present invention, the feeding or stitch-positioning mechanism of the machine is rendered comparatively simple and adaptable for high speed operation, considering its versatility and wide range of usefulness. By providing the machine with a series or set of interchangeable lateral-feed wheels having variously placed tripping points and variously cut cam-grooves, some with and some without filler-blocks, the machine may be readily adapted, without adjustments dependent upon the skill of the operator, to produce stitched patterns of various physical characteristics or, in the present instance, to produce buttonholes of various contours, which may involve either variations in length or in the character of the ends (as by provision or omission of eyelet or barred ends), or both, each of such interchangeable feed-wheels being designed to effect the control of the machine to produce buttonholes having one of the desired contours. While the various features of construction and arrangement of parts are herein represented in their preferred embodiments, it will be readily appreciated that they are susceptible of material modification within the scope of the invention.

Having thus set forth the nature of the invention, what I claim herein is—

1. In a sewing machine, in combination, stitch-forming mechanism, a work-holder, feeding mechanism for producing a given number of normal relative stitch-positioning movements between said stitch-forming mechanism and work-holder to cause a given number of stitches to be normally laid in a predetermined order or arrangement, an auxiliary feed-controlling element, and manually controlled coupling means between said auxiliary feed-controlling element and said feeding mechanism for changing the arrangement of certain of the stitches normally produced by the machine.

2. In a sewing machine, in combination, stitch-forming mechanism, a work-holder, feeding mechanism for producing a given number of normal relative stitch-positioning movements between said stitch-forming mechanism and work-holder to cause a given number of stitches to be normally laid in a predetermined order or arrangement, an auxiliary feed-controlling element additional to said feeding mechanism, and connecting means between said auxiliary feed-controlling element and said feeding mechanism for changing the arrangement of certain of the stitches normally produced by the machine.

3. In a sewing machine, in combination, stitch-forming mechanism, a work-holder, feeding mechanism for producing normal relative stitch-positioning movements between said stitch-forming mechanism and work-holder to cause the stitches to be normally laid in a predetermined order or arrangement, a readily removable auxiliary feed-controlling element additional to said feeding mechanism, and connecting means between said auxiliary feed-controlling element and said feeding mechanism for changing the arrangement of stitches normally produced by the machine, said auxiliary feed-controlling element being readily replaceable by any one of a series of similar elements each having distinct physical characteristics and adapted to modify the action of said feeding mechanism.

4. In a sewing machine, in combination, stitch-forming mechanism, a stop-motion therefor, a work-holder, feeding mechanism for producing normal relative stitch-positioning movements between said stitch-forming mechanism and work-holder to cause the stitches to be laid in a predetermined order or arrangement, a stop-motion and feed-controlling element, and operative connections between said element and said stop-motion and feeding mechanisms for changing the arrangement of stitches normally produced by the machine.

5. In a sewing machine, in combination, stitch-forming mechanism, a stop-motion therefor, a work-holder, feeding mechanism for producing normal relative stitch-positioning movements between said stitch-forming mechanism and work-holder to cause the stitches to be laid in a predetermined order or arrangement, a stop-motion and feed-controlling element, and operative connections between said element and said stop-motion and feeding mechanisms for changing the arrangement of stitches normally produced by the machine, said combined stop-motion and feed-controlling element being readily removable and replaceable by any one of a series of similar elements each having distinct controlling characteristics adapted to modify the physical characteristics of the work produced by the machine.

6. In a buttonhole sewing machine, in combination, stitch-forming mechanism, a work-holder, and feeding mechanism for producing stitch-positioning movements between the stitch-forming mechanism and the work-holder in the production of a stitched buttonhole, said feeding mechanism comprising self-contained means adapted to be set at will preparatory to a buttonhole-producing cycle to vary the action thereof for forming a given number of stitches into either a barred or unbarred buttonhole.

7. In a buttonhole sewing machine, in combination, stitch-forming mechanism, a work-holder, feeding mechanism including primary feed-controlling means for producing stitch-positioning movements between the stitch-forming mechanism and work-holder in the production of a stitched buttonhole, an auxiliary feed-controlling device, and means for causing the latter to assume partial control of said stitch-positioning movements during the action of the stitch-forming and feeding mechanisms to effect a modified arrangement of certain of the stitches normally produced by the machine.

8. In a buttonhole sewing machine, in combination, stitch-forming mechanism, a work-holder, and feeding mechanism for producing stitch-positioning movements between the stitch-forming mechanism and the work-holder in the production of a stitched buttonhole, said feeding mechanism comprising means including elements performing their respective functions in buttonhole-producing cycles of equal duration adapted to be set at will preparatory to a buttonhole-producing cycle to vary the action thereof for stitching either a barred or unbarred buttonhole.

9. In a buttonhole sewing machine, in combination, stitch-forming mechanism, a work-holder, feeding mechanism for producing stitch-positioning movements between the stitch-forming mechanism and the work-holder, and automatic controlling means adapted to cause the stitch-forming mechanism to act during predetermined equal portions of successive buttonhole producing cycles of equal duration in producing either a barred or unbarred buttonhole, said feeding mechanism comprising manually controlled means adapted to be set at will preparatory to a buttonhole-producing cycle to vary the action thereof for stitching either a barred or unbarred buttonhole.

10. In a buttonhole sewing machine, in combination, stitch-forming mechanism, a work-holder, and feeding mechanism for producing between them relative travelling movements and comprising a primary actuating member and independent connections between the same and the work-holder for producing normal relative travelling movements, and an auxiliary actuating member performing a single cycle of movement for a plurality of stitch-forming cycles and adapted to act upon one of said connections to vary said normal movements.

11. In a buttonhole sewing machine, in combination, stitch-forming mechanism, a work-holder, primary feeding mechanism for producing stitch-positioning components of motion between the stitch-forming mechanism and the work-holder in mutually transverse directions in the production of a stitched buttonhole, and auxiliary feed-controlling means adapted to assume control of the component of relative motion between said stitch-forming mechanism and said work-holder in one of said directions during a continuance of said component of relative motion in the other of said directions.

12. In a sewing machine, in combination, stitching-forming mechanism, a work-holder, a primary actuating element and a positively acting operative connection for producing to-and-fro relative motion between said stitch-forming mechanism and work-holder, an auxiliary rotary actuating element performing a single rotation for a plurality of stitch-forming cycles and automatically actuated means for rendering said operative connection ineffective and at the same time establishing a positively acting connection with said auxiliary actuating element to thereby shift the control of said to-and-fro relative motion from the primary to the auxiliary actuating element.

13. In a sewing machine, in combination, stitch-forming mechanism, a work-holder, main and auxiliary feed-cams each performing a single cycle of movement for a plurality of stitch-forming cycles, and means for shifting control of the feed from one to the other of said cams while the machine is in operation.

14. In a buttonhole sewing machine, in combination, stitch-forming mechanism, a work-holder, primary feeding mechanism for producing stitch-positioning movements between the stitch-forming mechanism and the work-holder in a given order or arrangement in the production of a stitched buttonhole, and a readily removable and replaceable feed-changing member adapted to act automatically during the stitching operation to vary the arrangement of certain of the stitches of said buttonhole.

15. In a buttonhole sewing machine, in combination, stitch-forming mechanism, a work-holder, and feeding mechanism for producing between them relative travelling movements and comprising a primary actuating member and independent connections between the same and the work-holder for producing normal relative travelling movements, and a readily accessible and removable auxiliary actuating member replaceable by a similar member with differently arranged active parts and adapted to act upon one of said connections to vary said normal movements in accordance with the respective auxiliary actuating member.

16. In a buttonhole sewing machine, in combination, stitch-forming mechanism, a work-holder, and feeding mechanism for producing between them relative travelling movements and comprising a primary actuating member and independent connections between the same and the work-holder for producing normal relative travelling movements, an auxiliary actuating member adapted to act upon one of said connections during the continued shift of the work-holder by the other of said connections for varying said normal movements, and means for establishing and interrupting operative relation between the auxiliary actuating member and said one of said connections.

17. In a buttonhole sewing machine, in combination, stitch-forming mechanism, a work-holder, a main-shaft, primary feeding mechanism for producing travelling stitch-positioning movements between the stitch-forming mechanism and the work-holder in the production of a stitched buttonhole, auxiliary feed-changing means adapted to act automatically during the continuance of motion of the work-holder by the primary feeding mechanism to vary the arrangement of certain of the stitches of said buttonhole, and actuating connections between said means and the main-shaft, said actuating connections including automatically acting coupling and uncoupling means.

18. In a buttonhole sewing machine, in combination, stitch-forming mechanism, a work-holder, feeding mechanism for producing between them relative travelling movements and comprising a plurality of actuating members and independent connections between the same and the work-holder for producing normal relative travelling movements, an auxiliary actuating member performing a cycle of movements for a plurality of stitch-forming cycles and adapted to act upon one of said connections for varying said normal movements, and automatically acting means for establishing and interrupting operative relation between the auxiliary actuating member and said one of said connections.

19. In a buttonhole sewing machine, in combination, stitch-forming mechanism, a stop-motion, a work-holder, and feeding mechanism for producing between them relative to-and-fro travelling movements and comprising a primary actuating member and independent positive connections between the same and the work-holder for producing normal to-and-fro relative travelling movements, and an auxiliary actuating member adapted to act positively upon one of said connections for varying said normal to-and-fro movements, independent means for driving said actuating members, and means for maintaining one of said actuating members disconnected from its driving means during a portion of the operative period of the other, and connections with said auxiliary actuating member for controlling said stop-motion.

20. In a buttonhole sewing machine, in combination, stitch-forming mechanism, a work-holder, a slit-cutter, means including a feed-controlling element adapted to produce relative stitch-positioning movements transversely of the length of the buttonhole between said stitch-forming mechanism and work-holder in the production of a stitched buttonhole, a second feed-controlling element, and automatic means for rendering said elements alternately effective during the action of the stitch-forming mechanism at each side of the buttonhole slit position.

21. In a buttonhole sewing machine, in combination, stitch-forming mechanism, a work-holder, and feeding mechanism for producing between them relative travelling movements and comprising a primary actuating member and independent connections between the same and the work-holder for producing normal relative travelling movements, one of said connections comprising relatively movable parts of which one is in permanent operative relation with said actuating means, an auxiliary actuating member, and means including a common element carried by the movable part of said connection and adapted to act alternately to couple said parts together while disengaged from the auxiliary actuating member and to operatively engage said auxiliary actuating member while said parts are uncoupled.

22. In an automatic buttonhole sewing machine, in combination, stitch-forming mechanism, a work-holder, feeding mechanism for producing relative movement between said stitch-forming mechanism and work-holder, said feeding mechanism including a rapid-feed actuating shaft and a stitching-feed actuating shaft, automatic buttonhole cutting mechanism, means for stopping the stitching-feed shaft and coupling the rapid-feed shaft with the source of power after the buttonhole has been stitched, and a tripping point actuated by said rapid-feed shaft and adapted to initiate the action of said cutting mechanism at the close of a buttonhole producing cycle.

23. In an automatic buttonhole sewing machine, in combination, a rapid-feed shaft, a driving shaft, a clutch connection between said shafts, a clutch-actuating element, a constantly to-and-fro moving actuating element, a spring-pressed connecting member carried by one of said elements and a pin carried by the other of said elements and adapted to cooperate with said connecting member, a latch for holding said connecting member in inoperative position, and means for releasing said latch, said connecting member being formed with an inclined shoulder adapted to cooperate with said pin to shift said connecting member to inoperative position after said clutch has been actuated.

24. In a buttonhole sewing machine, in combination, stitch-forming mechanism, actuating means therefor including a stop-motion device, a work-holder, and feeding mechanism for producing relative movement between said stitch-forming mechanism and work-holder, said feeding mechanism including a continuously rotating shaft, a rapid-feed shaft, a main feed-wheel permanently connected to said rapid-feed shaft, controlling means carried by said rapid-feed shaft for initiating the starting and stopping of the stitch-forming mechanism at predetermined times, rotary coupling means for establishing driving relation between said continuously rotating and rapid-feed shafts, additional means carried by said rapid-feed shaft for interrupting driving relation between said shafts when the stitch-forming mechanism is started, and one-way acting connections for driving the main-feed wheel during the stitching operation from the stitch-forming mechanism actuating means.

25. In a buttonhole sewing machine, in combinatiton, a continuously running shaft, stitch-forming mechanism, a work-holder, a main feed-wheel for producing relative movement between said stitch-forming mechanism and the work-holder, a feed-wheel driving member journaled concentrically with said main feed-wheel, one-way-acting connecting means whereby said main feed-wheel may be driven by said member, stitching-feed actuating connections between said stitch-forming mechanism and said member, and rapid-feed actuating connections between said continuously running shaft and said main feed-wheel for driving the latter while the stitching mechanism is inactive to effect relative feeding movements between the stitch-forming mechanism and work-holder between initial and stitching positions.

26. In a buttonhole sewing machine, in combination, a continuously running shaft, stitch-forming mechanism, a work-holder, a main feed-wheel for producing relative movement between said stitch-forming mechanism and the work-holder, a feed-wheel driving member journaled concentrically with said main feed-wheel, one-way acting connecting means whereby said main feed-wheel may be driven by said member, stitching-feed actuating connections between said stitch-forming mechanism and said member, rapid-feed actuating connections between said continuously running shaft and said main feed-wheel, and automatic controlling means for rendering said stitching-feed and rapid-feed actuating connections alternately effective.

27. In a buttonhole sewing machine, in combination, stitch-forming mechanism, actuating means therefor including a stop-motion device, a work-holder, feeding mechanism for producing relative movement between said stitch-forming mechanism and work-holder, a continuously rotating shaft, a rapid-feed shaft, a main feed-wheel permanently connected to said rapid-feed shaft, controlling means carried by said rapid-feed shaft for initiating the starting and stopping of the stitch-forming mechanism at predetermined times, rotary coupling means for establishing driving relation between said continuously rotating and rapid-feed shafts, additional means carried by said rapid-feed shaft for interrupting the driving relation between said shafts when the stitch-forming mechanism is started, one-way-acting connections for driving the main feed-wheel during the stitching operation from the stitch-forming mechanism actuating means, means actuated by said stop-motion for re-establishing the driving relation between said continuously rotating and rapid-feed shafts upon the stopping of the stitch-forming mechanism, and means carried by the rapid-feed shaft for again interrupting driving relation between said shafts after the stitch-forming mechanism and work-holder have been relatively shifted to initial position.

28. In a buttonhole sewing machine, in combination, stitch-forming mechanism, a work-holder, feeding mechanism including a primary cam and connections between said cam and work-holder for controlling the lateral movement of the work-holder relatively to the stitch-forming mechanism while stitching around the eyelet-end of a buttonhole, a readily removable and replaceable auxiliary cam adapted to control the lateral movement of the work-holder while stitching a taper-bar at the opposite end of the buttonhole, and means for shifting the control of the lateral movement of the work-holder from one to the other of said cams while stitching along the straight sides of the buttonhole.

29. In a buttonhole sewing machine, in combination, a frame comprising a hollow base and an overhanging bracket-arm, a work-holder mounted for horizontal movement upon said base, stitch-forming and feeding mechanisms incorporated in said frame, said feeding mechanism including a main feed-cam disposed within said base, a readily removable and replaceable auxiliary feed-cam mounted exteriorly of said base, operative connections between said feed-cams and work-holder, and means for driving said feed-cams.

30. In a buttonhole sewing machine, in combination, a stitch-forming mechanism, a work-holder, feeding mechanism comprising a main feed-actuating element and independent connections for producing relative movement between said stitch-forming mechanism and work-holder in mutually transverse directions, and an auxiliary feed-actuating element performing a single cycle of motion for a plurality of stitch-forming cycles, one of said connections including a shiftable device adapted to transfer the control of said one of said connections from the main to the auxiliary feed-actuating element.

31. In a buttonhole sewing machine, in combination, stitch-forming mechanism, a stop-motion device, a work-holder, primary feeding mechanism for producing relative travelling movements between said stitch-forming mechanism and work-holder in the production of a buttonhole of a given type, a buttonhole cutting device including interchangeable knives different from one another in contour, and auxiliary feed-controlling means including a feed-shaft and suitable connections actuated thereby for timing the action of said stop-motion to determine the duration of the stitching period, for setting the cutting device into operation and for governing the action of the feeding mechanism to produce a buttonhole of another type.

32. In a buttonhole sewing machine, in combination, a driving element, stitch-forming mechanism, a work-holder, feeding mechanism for producing stitch-positioning movements between said stitch-forming mechanism and work-holder, said feeding mechanism including a feed-wheel, a rapid-feed shaft permanently connected thereto, an automatically controlled clutch between said rapid-feed shaft and said driving element adapted to cause said rapid-feed shaft to drive said feed-wheel for a predetermined time upon starting the machine, stitching-feed actuating means independent of said rapid-feed shaft for subsequently driving said feed-wheel, and controlling means carried by said rapid-feed shaft for determining the time of action of said stitching-feed actuating means.

33. In an automatic buttonhole sewing machine, in combination, stitch-forming mechanism, buttonhole cutting mechanism, a work-holder feeding mechanism for producing stitch-positioning movements between said stitch-forming mechanism and work-holder, said feeding mechanism including independent rapid and stitching-feed actuating shafts, starting means for the cutting mechanism including tripping means carried by the rapid-feed shaft, a manually operated element adapted when actuated to initiate the action of said feeding and stitch-forming mechanisms, and a latch for detaining said element in starting position, said cutting mechanism starting means being adapted when actuated to trip said latch to permit restarting of the machine.

34. In a buttonhole sewing machine, in combination, stitch-forming mechanism, a work-holder, feeding mechanism for producing relative movements between said stitch-forming mechanism and work-holder, a shaft running continuously throughout successive buttonhole producing cycles, a clutch for coupling said feeding mechanism with said shaft, a constantly moving clutch actuating element, and means adapted to connect said element with said clutch to throw the latter either into or out of action.

35. In a buttonhole sewing machine, in combination, a shaft running continuously throughout successive buttonhole producing cycles, stitch-forming mechanism, a stop-motion therefor, a work-holder, and feeding mechanism for producing relative movement between said stitch-forming mechanism and work-holder, said feeding mechanism including a main feed-wheel, a one-way-acting rotary driving connection between said stitch-forming mechanism and the main feed-wheel, and a rotary clutch adapted to establish driving relation between said continuously rotating shaft and the main feed-wheel to actuate the latter while the stitch-forming mechanism is inactive, thereby producing relative shifting movement of the work-holder and stitching mechanism between initial and stitching positions.

36. In a buttonhole sewing machine, in combination, a shaft running continuously throughout successive buttonhole producing cycles, stitch-forming mechanism, a stop-motion therefor, a work-holder, and feeding mechanism for producing relative movement between said stitch-forming mechanism and work-holder, said feeding mechanism including a main feed-wheel, a rapid feed-shaft permanently connected to said main feed-wheel, a one-way-acting rotary driving connection independent of said rapid-feed shaft between said stitch-forming mechanism and the main feed-wheel, and a clutch adapted to establish driving relation between said continuously rotating and rapid-feed shafts to actuate the rapid-feed shaft while the stitch-forming mechanism is inactive.

37. In a buttonhole sewing machine, in combination, a rapid-feed shaft, a shaft running continuously throughout successive buttonhole producing cycles, a clutch connection between said shafts, a clutch operating member, a continuously acting actuating element, independent oppositely acting connections between said element and member for shifting the latter in opposite directions and automatically operated controlling means for said connections whereby said clutch may be thrown into or out of action at predetermined times during the cycle of operation.

38. In an automatic buttonhole sewing machine, in combination, stitch-forming mechanism, buttonhole cutting mechanism, a work-holder, feeding mechanism for producing stitch-positioning movements between said stitch-forming mechanism and work-holder, said feeding mechanism including a feed-wheel and independent rapid- and stitching-feed shafts with independent connections for driving said feed-wheel at different times during a buttonhole producing cycle, and tripping means carried by said rapid-feed shaft and adapted to initiate the action of said cutting mechanism.

39. In a buttonhole sewing machine, in combination, stitch-forming mechanism, a stop-motion therefor, buttonhole cutting mechanism, controlling means for said cutting mechanism adapted to act automatically to start the latter subsequent to the stitch-forming operation, said controlling means including a manually operable cutter-controlling device for rendering said means ineffective to start the cutting mechanism, a starting device adapted when shifted to starting position to initiate the action of the stitch-forming mechanism, a latch for retaining said starting device in starting position, and a tripping connection between said cutting mechanism controlling means and said latch, said tripping connections being adapted to act automatically independently of the position of the manually operable cutter-controlling device.

40. In an automatic buttonhole sewing machine, in combination, stitch-forming mechanism, an automatically controlled stop-motion therefor, a work-clamp, feeding mechanism for producing relative stitch-positioning movements between said stitch-forming mechanism and work-clamp, said feeding mechanism including a rapid-feed shaft adapted to feed said stitch-forming mechanism and work-clamp relatively prior to the action of the stitch-forming mechanism, a rotary clutch device for starting said rapid-feed shaft, a clamp-closing device, and means controlled by the motion of the clamp closing device for throwing in said clutch to start said rapid-feed shaft.

41. In an automatic buttonhole sewing machine, in combination, stitch-forming mechanism, an automatically controlled stop-motion therefor, a work-clamp, feeding mechanism for producing relative stitch-positioning movements between said stitch-forming mechanism and work-clamp, said feeding mechanism including a rapid-feed shaft adapted to feed said stitch-forming mechanism and work-clamp relatively prior to the action of the stitch-forming mechanism, a rotary clutch-device for starting said rapid-feed shaft, a clamp-spreading device, and means controlled by the motion of said clamp-spreading device for actuating said clutch to start said rapid-feed shaft.

42. In an automatic buttonhole sewing machine, in combination, stitch-forming mechanism, a stop-motion therefor, a work-holder, a feed-wheel for producing relative movement between said stitch-forming mechanism and the work-holder, stitching-feed actuating means operatively connected with said stitch-forming mechanism for driving said feed-wheel while the stitch-forming mechanism is active, rapid-feed actuating means including a continuously rotating shaft and rotary connections between said shaft and feed-wheel for imparting a continuous movement to the latter at another time during the cycle, and automatic means adapted to be actuated by said continuously rotating shaft and controlled by said stop-motion for rendering said rotary connections effective upon the stopping of the stitch-forming mechanism.

43. In an automatic buttonhole sewing machine, in combination, stitch-forming mechanism, a stop-motion therefor, a work-holder, a feed-wheel for producing relative movement between said stitch-forming mechanism and the work-holder, a readily replaceable controlling wheel connected to said feed-wheel for controlling said stop-motion, stitching-feed actuating means operatively connected with said stitch-forming mechanism for driving said feed-wheel while the stitch-forming mechanism is active, rapid-feed actuating means including a continuously rotating shaft and rotary connections between said shaft and feed-wheel for imparting a continuous movement to the latter at another time during the cycle, and automatic means controlled by said stop-motion for rendering said rotary connections effective upon the stopping of the stitch-forming mechanism.

44. In a buttonhole sewing machine in combination, stitch-forming mechanism, a work-holder, means including a feed-wheel for producing relative movement between said stitch-forming mechanism and work-holder, rapid driving means adapted to impart continuous rotary motion to said feed-wheel while the stitch-forming mechanism is inactive for quickly shifting the stitch-forming mechanism and the work-holder relatively between initial and stitching positions, and an eccentric-pin and toothed-wheel driving device whereby the stitch-forming mechanism effects slower and step-by-step rotary motion of said feed-wheel during the stitching.

45. In a buttonhole sewing machine in combination, stitch-forming mechanism, a work-holder, means including a feed-wheel for producing relative movement between said stitch-forming mechanism and work-holder, rapid driving means adapted to impart continuous rotary motion to said feed-wheel while the stitch-forming mechanism is inactive for quickly shifting the stitch-forming mechanism and the work-holder relatively between initial and stitching positions, an eccentric-pin and toothed-wheel driving device actuated by the stitch-forming mechanism, and a one-way-acting connection between said device and said feed-wheel whereby the stitch-forming mechanism effects slower and step-by-step rotary motion of said feed-wheel during the stitching.

46. In a buttonhole sewing machine, in combination, stitch-forming mechanism, a work-holder, feeding and barring mechanism including a feed wheel for relatively moving the stitch-forming mechanism and work-holder in the production of a barred buttonhole of a given length, said feeding and barring mechanism further including a readily removable controlling element distinct from said feed-wheel and replaceable by a similar element having differently related active parts for controlling the action of the machine in producing barred buttonholes of a different length.

47. In a buttonhole sewing machine, in combination, stitch-forming mechanism, a stop-motion therefor, a work-holder, feeding and barring mechanism including a feed-wheel for relatively moving the stitch-forming mechanism and work-holder in stitching and barring a buttonhole, said feeding and barring mechanism further including a readily removable element distinct from the feed-wheel for controlling the time of action of the stitch-forming mechanism and the lateral movement of the work-holder for barring, said element being replaceable by a similar controlling element having differently arranged active parts for producing a barred buttonhole of a different length.

48. In a buttonhole sewing machine, in combination, sewing mechanism, a stop motion therefor, buttonhole cutting mechanism, a work-holder, feeding mechanism for relatively moving the sewing mechanism and work-holder in the production of a finished buttonhole, said feeding mechanism including stitching feed actuating means for effecting the relative shift of the work and sewing mechanism while the latter is in operation and rapid feed actuating means for effecting the relative shift of the work and sewing mechanism in one continuous movement from cutting to sewing position and again from sewing to cutting position, a controlling element connected to the feeding mechanism for timing the throw-out of the rapid feed when stitching is to begin and for controlling the times of starting and stopping of the sewing mechanism, said controlling element being readily removable and replaceable by a similar element having differently arranged active parts timed to control the operation of the sewing and feeding mechanisms in the production of a buttonhole of a different length.

49. In a buttonhole sewing machine, in combination, stitch-forming mechanism, a stop motion therefor, a buttonhole cutter, a work-holder, a feed-wheel for relatively moving the stitch-forming mechanism and work-holder, stitching feed actuating means for driving the feed-wheel at a relatively slow rate during the sewing, a continuously rotating rapid feed actuating element, a clutch for connecting the rapid feed actuating element to the feed-wheel to drive the latter at a rapid rate from cutting to sewing position and vice versa, and a controlling element movable synchronously with the work-holder for timing the period of operation of the stitch-forming mechanism and for throwing out the rapid feed clutch at sewing position, said controlling element being readily removable and replaceable by a similar controlling element having differently related active parts for controlling the operation of the machine in the production of buttonholes of a different length.

50. In a buttonhole sewing machine, in combination, a buttonhole cutter, stitch-forming mechanism, a work-holder, feeding mechanism including a feed-wheel for producing relative movement between the stitch-forming mechanism and work-holder in the production of an unbarred buttonhole having a slit of given length, said feeding mechanism further including a readily removable controlling element distinct from said feed-wheel and replaceable by another similar element having differently arranged active parts for controlling the relative movement between the stitch-forming mechanism and work-holder in producing a barred buttonhole having a slit of the same length as that of the unbarred buttonhole.

51. A buttonhole sewing machine having, in combination, overedge stitch-forming mechanism, a work-holder, a longitudinal-feed cam-element and longitudinal-feed connections for relatively moving the stitch-forming mechanism and work-holder lengthwise of the buttonhole, a lateral-feed cam-element and lateral-feed connections for relatively moving the stitch-forming mechanism and work-holder crosswise of the buttonhole, one of said cam-elements being constructed as an interchangeable unit and mounted for ready removal and replacement without disturbing the other cam-element and its feeding connections.

52. A buttonhole sewing machine having, in combination, overedge stitch-forming mechanism including a rotary turret, a work-holder, a longitudinal-feed cam-element and longitudinal-feed connections for relatively moving the stitch-forming mechanism and work-holder lengthwise of the buttonhole, a lateral-feed cam-element and lateral-feed connections for relatively moving the stitch-forming mechanism and work-holder crosswise of the buttonhole, said lateral-feed cam-element being constructed as an interchangeable unit and mounted for ready removal and replacement without disturbing the longitudinal-feed cam-element and its connections.

53. A buttonhole sewing machine having, in combination, overedge stitch-forming mechanism, stop-motion mechanism for controlling its period of action, a work-holder, feeding mechanism including a feed-wheel formed with a cam for relatively feeding the stitch-forming mechanism and work-holder lengthwise of the buttonhole, and a second feed-wheel formed with a cam for relatively feeding the stitch-forming mechanism and work-holder crosswise of the buttonhole, said second feed-wheel embodying an interchangeable element which is readily removable for replacement by a similar element having different controlling characteristics, without disturbing the longitudinal feed-wheel, whereby the character of the buttonhole may be readily and quickly altered without readjustment of the parts of the machine.

54. A buttonhole sewing machine having, in combination, a frame, overedge stitch-forming mechanism, a work-holder, a longitudinal-feed cam-element and connections for relatively moving the stitch-forming mechanism and work-holder lengthwise of the buttonhole, a feed-shaft journaled horizontally in said frame and connected to rotate simultaneously with the longitudinal-fed cam-element, said shaft having a readily accessible outboard projection, and a lateral-feed cam-element and connections for relatively feeding the stitch-forming mechanism and work-holder crosswise of the buttonhole, said lateral-feed cam-element being constructed as an interchangeable unit and mounted on the outboard projection of said feed-shaft for ready removal and replacement without disturbing the feed-shaft or longitudinal-feed cam-element.

55. A buttonhole sewing machine having, in combination, a hollow frame, overedge stitch-forming mechanism, a work-holder, a longitudinal-feed cam-element mounted within said hollow frame and connections for relatively feeding the stitch-forming mechanism and work-holder lengthwise of the buttonhole, a lateral-feed cam-element accessibly mounted at the side of said hollow frame and connections for relatively feeding the stitch-forming mechanism and work-holder crosswise of the buttonhole, said lateral-feed cam-element being constructed as an interchangeable unit independently of the longitudinal-feed cam-element and adapted for ready removal and replacement without disturbing said longitudinal-feed cam-element.

56. A buttonhole sewing machine having, in combination, overedge stitch-forming mechanism, a work-holder, a longitudinal-feed cam-element and longitudinal-feed connections permanently in operative engagement therewith for relatively feeding the stitch-forming mechanism and work-holder lengthwise of the buttonhole, a plurality of lateral-feed cam-elements, selectively controlled lateral-feed connections independent of the longitudinal-feed connections for relatively feeding the stitch-forming mechanism and work-holder crosswise of the buttonhole from a desired one of said lateral-feed cam-elements without disturbing the longitudinal-feed cam-element and connections.

57. A buttonhole sewing machine having, in combination, overedge stitch-forming mechanism including a rotary turret, a work-holder, a longitudinal-feed cam-element and longitudinal-feed connections permanently in operative engagement therewith for moving the work-holder lengthwise of the buttonhole, a plurality of lateral-feed cam-elements mounted in the machine, and lateral-feed connections including selectively controlled means for connecting a desired one of said lateral-feed cam-elements with the work-holder, without disturbing the longitudinal-feed cam-element and connections.

58. A buttonhole sewing machine having, in combination, overedge stitch-forming mechanism, rotary supporting means therefor, a work-holder, a longitudinal feed-cam and connections for relatively moving the stitch-forming mechanism and work-holder a prescribed distance lengthwise of the buttonhole and return, a plurality of lateral-feed cam-elements mounted in the machine, and lateral-feed connections including manually selective means for transferring the control of the relative lateral movement between the stitch-forming mechanism and work-holder from one to another of said lateral-feed cam-elements, at the will of the operator, whereby the machine may be quickly set to sew different buttonholes.

59. A buttonhole sewing machine having, in combination, stitch-forming mechanism, a work-holder, a longitudinal-feed cam-element and connections for moving the work-holder lengthwise of the buttonhole, a plurality of lateral-feed cam-elements mounted in the machine, and lateral-feed connections including selectively controlled means for connecting a desired one of said lateral-feed cam-elements with the work-holder, one of said lateral-feed cam-elements being constructed as an interchangeable unit and being accessibly mounted for ready removal from the machine and replacement by a similar cam-element having different controlling characteristics, without disturbing the longitudinal-feed cam and connections.

60. A buttonhole sewing machine having, in combination, overedge stitch-forming mechanism, rotary supporting means therefor, a work-holder, a longitudinal-feed cam-element and connections for moving the work-holder lengthwise of the buttonhole, a plurality of lateral-feed cam-elements mounted in the machine, and lateral-feed connections including selectively controlled means for connecting a desired one of said lateral-feed cam-elements with the work-holder, one of said lateral-feed cam-elements being constructed as an interchangeable unit and being accessibly mounted for ready removal from the machine and replacement by a similar cam-element having different controlling characteristics, without disturbing the longitudinal-feed cam and connections.

61. A buttonhole sewing machine having, in combination, overedge stitch-forming mechanism including a rotary turret, a work-holder, feeding mechanism including a longitudinal-feed cam and connections for relatively moving the stitch-forming mechanism and work-holder lengthwise of the buttonhole, and a lateral-feed cam and connections for relatively moving the stitch-forming mechanism and work-holder crosswise of the buttonhole and during a continuance of the longitudinal-feed while sewing the initial and final stitches, thereby producing a taper-barred buttonhole, said lateral-feed cam embodying an interchangeable element which is mounted for ready removal and replacement by a substitute element, without disturbing the longitudinal feed cam and connections, whereby the machine may be quickly changed over to sew an unbarred buttonhole while the lateral feed is under the control of said substitute element.

In testimony whereof, I have signed my name to this specification.

EDWARD B. ALLEN.